United States Patent
Imura et al.

(10) Patent No.: US 6,770,257 B1
(45) Date of Patent: Aug. 3, 2004

(54) PROCESSES FOR PRODUCING ANATASE TITANIUM OXIDE AND TITANIUM OXIDE COATING MATERIAL

(75) Inventors: Tatsuya Imura, Osaka (JP); Seiji Terada, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/890,768

(22) PCT Filed: Jun. 30, 1999

(86) PCT No.: PCT/JP99/03528

§ 371 (c)(1), (2), (4) Date: Aug. 3, 2001

(87) PCT Pub. No.: WO00/46153

PCT Pub. Date: Aug. 10, 2000

(30) Foreign Application Priority Data

Feb. 4, 1999 (JP) .............................. 11-027008
Feb. 15, 1999 (JP) .............................. 11-035358

(51) Int. Cl.$^7$ .......................................... C01G 23/047
(52) U.S. Cl. ...................................... 423/610
(58) Field of Search ........................................ 423/610

(56) References Cited

U.S. PATENT DOCUMENTS 5,972,831 A * 10/1999 Poncelet et al. ......... 423/118.1

FOREIGN PATENT DOCUMENTS

| JP | A 60-65708 | 4/1985 |
|---|---|---|
| JP | A 63-17221 | 1/1988 |
| JP | 63-017221 | 1/1988 |
| JP | 63-229139 | 9/1988 |
| JP | A 63-229139 | 9/1988 |
| JP | 6-293519 | 10/1994 |
| JP | A 6-293519 | 10/1994 |
| JP | 10-174882 | 6/1998 |
| JP | A 10-265223 | 10/1998 |
| JP | A 11-29759 | 2/1999 |

* cited by examiner

*Primary Examiner*—Steven Bos
(74) *Attorney, Agent, or Firm*—Oliff & Berridge, PLC

(57) ABSTRACT

A method for producing an anatase type titanium dioxide powder which comprises subjecting a titania sol, a titania gel or a titania sol-gel mixture to a heat treatment and simultaneously to a pressure treatment in a closed vessel, and subsequently drying the resulting product; and a method for producing an anatase type titanium dioxide slurry which comprises subjecting a titania sol, a titania gel or a titania sol-gel mixture to a heat treatment and simultaneously to a pressure treatment in a closed vessel, and subsequently agitating the resulting product to provide a dispersion. This method can be used for producing an anatase type titanium dioxide powder which exhibits high photocatalytic activity and has a large specific surface area, and an anatase type titanium dioxide slurry which has high storage stability and high dispersibility in a process operated at a relatively low temperature and having a small number of steps. A slurry thus obtained can be used as a coating material having photocatalytic activity which can be coated on a material having poor heat resistance.

11 Claims, 14 Drawing Sheets

PROCESSES FOR PRODUCING ANATASE TITANIUM OXIDE AND TITANIUM OXIDE COATING MATERIAL

TECHNICAL FIELD

The present invention relates to a process for producing anatase titanium oxide particularly having high photocatalytic activity as one of photocatalysts used, for example, as environment cleaning materials, for example, for the removal of harmful materials, the deodorisation/decomposition of offensive odor substances, antifouling, and sterilization, and more particularly to a process for producing anatase titanium oxide powder having high photocatalytic activity and large specific surface area, and a process for producing anatase titanium oxide slurry, containing the anatase titanium oxide powder, with excellent stability and dispersibility.

The present invention also relates to a process for producing a coating material of titanium oxide as one of photocatalysts used, for example, as environment cleaning materials, for example, for the removal of harmful materials, the deodorisation/decomposition of offensive odor substances, antifouling, and sterilization. More particularly, the present invention relates to a process for producing a titanium oxide coating material which, particularly when anatase titanium oxide having high photocatalytic activity is coated at a low temperature, the photocatalytic activity can persist for a long period of time, and, at the same time, can maintain high adhesion strength between the coating and the member as the substrate for a long period of time, does not deteriorate the appearance of the member by virtue of excellent transparency of the coating, and enables the production of a binder for improving adhesion strength.

BACKGROUND ART

Photocatalysts are materials that, through radicals (hydroxy radicals, superoxide anions, etc.) generated upon the application of ultraviolet light onto the surface thereto, can function to perform, for example, the removal of harmful materials (for example, benzene, dioxin, and volatile organic compounds), th deodorisation/decomposition of offensive odor substances (substanc s regulated by the Offensive Odor Control Law), antifouling, and sterilization.

In recent years, an attempt to utilize the above functions by coating the photocatalyst onto the surface of objects has been made. A number of oxides can be utilized as photocatalysts. Among them, titanium oxide is in many cases used as one of the photocatalysts, and, among others, anatase titanium oxide is superior from the viewpoints of both the function and safety.

Specifically, titanium oxide is classified into three crystal forms, i.e., anatase, rutile and hrookite forms, and amorphous form. Among them, anatase titanium oxide has the highest photocatalytic activity.

Anatase titanium oxide powder can be produced by a gas phase process and a liquid phase process. For each process, conventional techniques will be described.

Degussa P-25 manufactured by Nippon Aerosil Co., Ltd. is representative anatase titanium oxide produced by the gas phase process. In this process, titanium oxide powder having a specific surface area of 40 $m^2/g$ (BET method) can be produced by hydrolysis of titanium chloride in an oxygen atmosphere at a high temperature of 1000° C.

Further, there is also a report such that anatase titanium oxide is produced by a CVD (chemical vapor deposition) process at a controlled furnace temperature of 600 to 800° C. (Kagaku Kogaku Ronbunshu (J. Chem. Eng. Japan), Vol. 16, No. 3, 584–587, May 1990).

Sol-gel process, HyCOM (hydrothermal crystallization in Organic Media), and sulfuric acid process have been proposed for the production of anatase titanium oxide by the liquid phase process.

According to the sol-gel process, titanium oxide is produced from an alkoxide in the same manner as in the production of silica, and the sol-gel process should involve two steps, i.e., the step of preparing titanium hydroxide by hydrolysis and the step of sintering wherein titanium hydroxide is polycondensed by heating to give titanium oxide. Further, both the steps are carried out under the atmospheric pressure (for th sol-gel process, see, for example, "The Science of Sol-Gel Method," 8–15, published in July 1988 by AGNE SHOFU PUBLISHING INC.)

When anatase titanium oxide is prepared by the sol-gel process, the above step of sintering is indispensable, and the heating temperature for sintering should be in the range of 300 to 700° C. The reason why the heat treatment in the specific temperature range is necessary is as follows. When the heat treatment is carried out at a temperature below 300° C., titanium oxide remains unchanged from the amorphous form. On the other hand, when the heat treatment is carried out at a temperature above 700° C., anatase titanium oxide is converted to a crystal form having lower photocatalytic activity, i.e., rutile form.

In HyCOM, moisture contained in gas or water vapor produced from a separate water tank is fed, as water necessary for hydrolysis of an alkoxide, into a solvent with the titanium alkoxide being dissolved therein by the application of pressure (10 $kg/cm^2G$), thereby producing titanium oxide. In this case, the solvent with the alkoxide being dissolved therein and water are placed separately form each other in the apparatus. That is, water is absent in the starting material.

Titanium oxide produced by HyCOM is highly heat-resistant anatase titanium oxide which, for example, even after baking at 900° C., maintains the anatase form and has a specific surface area of 40 $m^2/g$ (J. Mater. Sci. Lett., 15, 197 (1996)).

As described in Japanese Patent Laid-Open No. 171408/1995, in the sulfuric acid process, an acidic titanium sol, prepared by heating and hydrolyzing titanium sulfate, is adjusted to pH 7 by the addition of sodium hydroxide, and filtration and washing are then carried out to prepare a crystal. Subsequently, water is added to the resultant titanium oxide wet cake to prepare titanium oxide slurry. The titanium oxide slurry is adjusted to pH 7 by the addition of sodium hydroxide, followed by hydrothermal treatment in an autoclave at 150° C. for 3 hr. Thereafter, the hydrothermally treated slurry is adjusted to pH 7 by the addition of nitric acid, and is then filtered. The cake is then washed with water, and is dried (110° C., 3 hr) to prepare titanium oxide.

Next, conv ntional production processes of titanium oxide-containing liquid and slurry will be d scribed.

Japanese Patent Laid-Open No. 99041/1996 proposes a production process which comprises the steps of: adding polyethylene glycol or ethylene oxide to a titania sol, prepared, for example, from an alkoxide of titanium and an alcohol amine; coating the mixture onto a substrate; and then heating the coated substrate gradually from room temperature to a temperature of 600 to 700° C. to prepare a thin film of an anatase titanium oxide. In this publication, there is a description to the effect that the baking temperature is preferably 600 to 700° C. This indicates that the step of sintering is necessary for the production of anatase titanium oxide.

Japanese Patent Laid-Open No. 277147/1996 also proposes a coating material produced by the sol-gel process. In this case, the step of baking at 350° C. is provided. Japanese Patent Laid-Open No. 21557/1996 also proposes the use, as a coating material, of a titanium oxide sol, prepared by a hydrolysis of a titanyl sulfate, after dilution with water. Also in this case, baking at 300° C. in the air is carried out.

Japanese Patent Laid-Open No. 257360/1996 proposes a production process which comprises the steps of: dispersing previously prepared anatase titanium oxide powder (F-25, manufactured by Nippon Aerosil Co., Ltd.) together with finely divided cellulose in water; and adding polyaluminum chloride as a coagulant to prepare a slurry material.

Regarding the dispersion of powdery anatase titanium oxide into water, for example, there is a report such that metatitanic acid is prepared from ilmenite as a starting material by the sulfuric acid process, and nitric acid is added to the metatitanic acid, followed by the dispersion of titanium oxide in the mixture to improve the dispersion and storage stability of the coating material (Kogyo Zairyo Vol. 45, No. 10, p. 48 (1997)).

In the production of anatase titanium oxide powder by the gas phase process, all the above production processes have drawbacks such as the necessity of using a special apparatus in the production of anatase titanium oxide due to the adoption of high-temperature reaction atmosphere (generally 800° C. or above in the case of the gas phase process) and the use of highly reactive titanium chloride as a starting material. In this connection, it should be noted that the above-described production processes of anatase titanium oxide by the gas phase process are a dry process which is utterly different from the production process of anatase titanium oxide by the liquid phase process according to the present invention.

Also in the case where the anatase titanium oxide powder is produced by the sol-gel process, as described above, the step of sintering is indispensable, and, to this end, heat treatment at a temperature of 300° C. or above is necessary.

In HyCOM, as described above, highly heat-resistant anatase titanium oxide is obtained. In this process, however, a special apparatus should be disadvantageously used for the preparation of anatase titanium oxide. In HyCOM, a solvent with an alkoxide being dissolved therein and water are placed separately from each other in the apparatus, and, thus, water is absent in the starting material. By contrast, according to the present invention, water is previously added to a titanium alkoxide as the starting material to hydrolyze the titanium alkoxide to titanium hydroxide. Thus, the HyCOM and the production process according to the present invention are utterly different from each other, for example, in procedure.

The production of anatase titanium oxide powder by the sulfuric acid process is disadvantageous in that the number of steps is large and, for example, the operation is very complicate.

For the anatase titanium oxide-containing slurry, in the case of a coating material prepared by hydrolysis, that is, a coating slurry, the step of heat treatment at 300° C. or above is necessary to finally prepare anatase titanium oxide. Due to this high temperature, the coating material cannot be coated on base materials having low heat resistance. Therefore, usable base materials are limited.

In the preparation of the coating material, dispersing powdery anatase titanium oxide in a solvent causes the coagulation of titanium oxide particles which makes it impossible to maintain the activity of the particulate photocatalyst. Further, in the form of the coating material, for example, the dispersion of anatase titanium oxide in the solution in heterogeneous, and, with the elapse of the time, titanium oxide particles disadvantageously settle at the bottom of the solution. That is, the coating material has a problem of storage stability. As with the above technique, the problem of particle coagulation or the like occurs also in the method where metatitanic acid is prepared from ilmenite as a starting material by the sulfuric acid process, and nitric acid is added to the metatitanic acid, followed by the dispersion of titanium oxide in the mixture.

Further, a method, wherein a third component in addition to titanium oxide is added for improving the adhesion, and a method, wherein a precoating is prepared, are also known.

For example, Japanese Patent Laid-Open No. 131834/1996 describes a method wherein a thermoplastic binder, such as acrylic resin, or a thermosetting resin, such as fluororesin, epoxy resin, or cyloxane resin, is formed on the surface of the substrate.

A method is also proposed wherein PTFE as one of fluororesins is used as a binder ("Hikarishokubai No Sekai (The world of photocatalysts)," issued in April 1998 by Kogyo Chosakai Publishing Co., Ltd.).

A proposal has also been made wherein photocatalytic decomposition-free silica is precoated on a substrate and, thereafter, a titanium oxide layer is coated, thereby improving the adhesion strength.

Thus, regarding the binder for ensuring the strength of adhesion to the member, the addition of ceramics, such as silica ($SiO_2$), or polymers, such as polymethyl methacrylate (PMMA), has hitherto been made.

However, when the adhesion of anatase titanium oxide onto the surface of the member with high adhesion strength is contemplated, as described in Japanese Patent Laid-Open Nos. 99041-1996 and 277147/1996, there is a problem such that treatment at a high temperature of 300° C. or above is necessary and, thus, titanium oxide cannot be coated onto members having low heat resistance.

The conventional binder user f r improving the adhesion of titanium oxide has the following problems.

As described in Japanese Patent Laid-Open No. 131834/1996, when organic matter is mixed, the photocatalyst decomposes the organic matter and thus cannot maintain the adhesion strength. Therefore, there is a limitation on the long-term persistence of the photocatalytic activity. Likewise, in the case of polymers, such as polymethyl methacrylate (PMMA), the decomposition of PMMA takes place by the photocatalytic activity, leading to a limitation on the persistence of adhesion strength.

In the case of silica, although the adhesion strength can be maintained, a separate material is necessary. This deteriorates the photocatalytic activity.

Japanese Patent Laid-Open No. 67516/1998 describes a method which comprises preparing a titanium hydroxide precipitate from a titanium solution and a basic solution, adding thereto aqueous hydrogen peroxide, and then heat treating the mixture at a temperature of 80° C. or above. By contrast, the production process according to the present invention is utterly different from this method in that an organic solvent is used, the step of recovering precipitate is not provided, and ozone treatment is carried out at a temperature of about 25° C. or below.

Further, in the prior art technique, as described in the above publication, there are two coating steps which render the process complicate.

DISCLOSURE OF THE INVENTION

First Invention

An object of the present invention is to provide a process for producing anatase titanium oxide powder wherein a titania sol, a titania gel, or a titania sol-gel mixture is heat treated in a closed vessel to hybridize the effect of pressure, whereby anatase titanium oxide powder having high photocatalytic activity and large specific surface area can be produced at a low heat treatment temperature of 250° C. or below via a small number of steps in a simple manner.

Another object of the first invention is to provide a process for producing anatase titanium oxide slurry wherein anatase titanium oxide produced by heat treatment within a closed vessel under pressure is subjected to, for example, ultrasonic disperion r stirring in the solvent used in the preparation of a titania sol, a titania gel, or a titania sol-gel mixture, whereby anatase titanium oxide slurry, which is very stable, is free from settling of titanium oxide particles, and can also be coated on the surface of materials having low heat resistance, can be produced at room temperature.

In order to attain the above object, the process for producing anatase titanium oxide according to the first invention comprises the steps of: heat treating a titania sol solution, a titania gel, or a titania sol-gel mixture in a closed vessel under pressure, said titania sol solution, titania gel, or titania sol-gel mixture containing as a solvent an alcohol represented by structural formula $C_nH_{2n+2}OH$; and then drying the treated product to prepare anatase titanium oxide powder.

The process for producing anatase titanium oxide according to the first invention comprises the steps of: heat treating a titania sol solution, a titania gel, or a titania sol-gel mixture in a closed vessel under pressure, said titania sol solution, titania gel, or titania sol-gel mixture containing as a solvent an alcohol represented by structural formula $C_nH_{2n+1}OH$; and then ultrasonically dispersing or stirring the treated product to prepare anatase titanium oxide slurry. As described above, stirring may be ultrasonic dispersion and, in addition, may of course be mechanical agitation or the like.

In these cases, examples of starting materials usable for the production of a titania sol or a titania gel include metal organic compounds, e.g., metal alkoxides and titanium oxalate, and metal inorganic compounds, e.g., titanium nitrate and titanium tetrachloride. Metal alkoxides include, for example, titanium tetramethoxide, titanium tetraethoxide, titanium isopropoxide, and titanium tetrabutoxide.

In the production process according to the present invention, the titania sol solution, the titania gel, or the titania sol-gel mixture is preferably heat treated in a closed vessel in the temperature range of 80 to 250° C.

As described above, the temperature, at which the contents of the closed vessel are heated, should be 80 to 250° C. because the solvent, which has dissolved the starting material, should be evaporated. When the heat treatment temperature is below 80° C., a lot of time is necessary for evaporating the whole solvent and, thus, satisfactory pressure cannot be applied. Further, in this case, the amount of anatase titanium oxide produced is not very large even after treatment for a considerably long period of time while applying pressure, and, thus, the treatment at a temperature below 80° C. is not suitable from the practical viewpoint. On the other hand, the treatment at a temperature above 250° C. requires special structure and equipment such as closed vessels and sealing materials.

Further, in the production process according to the present invention, the titania sol solution, the titania gel, or the titania sol-gel mixture is preferably treated in a closed vessel at a pressure of 1.5 to 350 atmA, more preferably 5 to 60 atmA.

For the pressure of treatment within the closed vessel, as described above, the lower limit is preferably 1.5 atmA, more preferably 5 atmA, while the upper limit is preferably 350 atmA, more preferably 60 atmA. When the pressure of treatment within the closed vessel is below the above lower limit, the dispersibility of the resultant anatase titanium oxide slurry is deteriorated. On the other hand, when the pressure of treatment within the closed vessel exceeds the above upper limit, extra apparatuses and equipment for the application of pressure should be additionally provided.

Further, in the production process according to the present invention, preferably, the contents of the closed vessel are heated to evaporate the solvent contained in the titania sol solution, the titania gel, or the titania sol-gel mixture, whereby the inside of the closed vessel is pressurized by gas generated as a result of the evaporation of the solvent. In this case, the pressure within the closed vessel can be controlled by the volume and the amount of the solvent within the closed vessel, and this can bring the pressure within the closed vessel to the above treatment pressure in the above defined range.

Further, the introduction of pr ssurized inert gas into the closed vessel can also regulate the pressure within the closed vessel.

As described above, according to the production process of the present invention, an alcohol having a structure represented by formula $C_nH_{2n+1}OH$ is contained as a solvent in the titania sol solution, the titania gel, or the titania sol-gel mixture.

The solvent for dissolving the starting material may be any solvent which can dissolve the titania sol or the titania gel. In particular, an alcohol having a structure represented by formula $C_nH_{2n+1}OH$ is preferably used as the solvent. For example, methanol, ethanol, 1-propanol, isopropyl alcohol, 1-butanol, 2-butanol, isobutyl alcohol, tert-butyl alcohol, 1-pentanol, 2-pentanol, and 3-pentanol are preferably used.

Further, according to the production processes of the present invention, preferably, at least one member selected from the group consisting of acidic materials, alkaline materials, organic polymers, and inorganic materials is added to the titania sol solution, the titania gal, or the titania sol-gel mixture.

If necessary, acidic materials, such as hydrochloric acid, nitric acid, and acetic acid, alkaline materials, such as ammonia and amine compounds, inorganic materials, such as silica, polymethacrylic acid resins, fluororesins, aromatic organic polymers and the like may be added to the starting material, such as titania sol.

Second Invention

In the first invention, a titania sol, prepared, for example, by adding a minor amount of water to titanium isopropoxide in isopropyl alcohol as an organic solvent, is heat treated in a closed vessel to evaporate isopropyl alcohol and to promote the crystallization to form anatase titanium oxide utilizing the vapor pressure and heat. In this case, the resultant titanium oxide slurry contains a large amount of isopropyl alcohol.

Japanese Patent Laid-Open No. 71418/1997 discloses a techniqu wherein a titanium hydroxide precipitate is first prepared from a titanium solution and a basic solution, such as an ammonia solution, and aqueous hydrogen peroxide is then added, followed by heat treatment at 80° C. or above to crystallize anatase titanium oxide. In this publication, although autoclaving is disclosed, there is no description on detailed treatment conditions and the like. According to the present invention, for example, a metal alkoxide is used as the starting material, and, when the metal alkoxide is mixed with aqueous hydrogen peroxide, hydrolysis and dissolution are simultaneously carried out without the formation of any precipitate, followed by heat treatment of the reaction solution at a temperature of 120 to 270° C., preferably 150 to 240° C., under hermetically sealed conditions to efficiently crystallize titanium oxide in a short time. Thus, the present invention is substantially different from the technique described in the above publication.

In the first invention wherein a titania sol or the like prepared by using an organic solvent as a solvent is used, coatability onto members having low organic solvent resistance is not always satisfactory. Further, when the organic solvent is used, there are many metal salts insoluble in the organic solvent. Therefore, disadvantageously, suitable metal salts cannot be added to titania sols or the like.

Accordingly, an object of the second invention is to provide production processes of anatase titanium oxide powder oxide powder and aqueous anatase titanium oxide slurry, wherein a substantially organic solvent-free, aqueous titania sol, titania gel, or titania sol-gel mixture is heat treated in a closed vessel under pressure, whereby anatase titanium oxide powder having high photocatalytic activity and large specific surface area and aqueous anatase titanium oxide slurry can be produced at a low heat treatment temperature of 270° C. or below, preferably 240° C. or below, without the generation of any organic solvent at the time of drying via a small number of steps in a simple manner.

Another object of the second invention is to provide production processes of powder composed mainly of anatase titanium oxide capable of developing photocatalytic activity and aqueous titanium xide slurry containing the same, which involve the step of hydrolyzing an titanium alkoxide with water contained in aqueous hydrogen peroxide or aqueous ozone to produce amorphous titanium oxide and, at the same time, instantaneously dissolving the produced amorphous titanium oxide in aqueous hydrogen peroxide or aqueous ozone, and the step of heat treating the resultant aqueous titania sol, titania gel, or titania sol-gel mixture in a closed vessel under pressure.

In order to attain the above object, the process for producing anatase titanium oxide according to the second invention comprises the steps of: heat treating an organic solvent-free aqueous titania sol solution, titania gel, or titania sol-gel mixture in a closed vessel under pressure; and then drying the treated product to prepare anatase titanium oxide powder.

Further, the process for producing anatase titanium oxide according to the second invention comprises the steps of: heat treating a substantially organic solvent-free aqueous titania sol solution, titania gel, or titania sol-gel mixture in a closed vessel under pressure; and then stirring or ultrasonically dispersing the treated product to prepare aqueous anatase titanium oxide slurry. As described above, for example, mechanical agitation and ultrasonic dispersion may be used for stirring.

In the production process according to the present invention, the organic solvent-free aqueous titania sol solution, titania gel, or titania sol-gel mixture is preferably heat treated in the temperature range of 120 to 270° C., more preferably in the temperature range of 150 to 240° C., in the closed vessel.

As described above, the temperature, at which the contents of the closed vessel are heated, is preferably 120 to 270° C., more preferably 150 to 240° C., because the solvent (water), which has dissolved the starting material, should be vaporized in a closed vessel. When the heating temperature is below the lower limit of the above range, the vaporization of water is unsatisfactory and, thus, the application of pressure is unsatisfactory. Therefore, in this case, the crystallization to form anatase titanium oxide cannot be promoted. On the other hand, in the case of heat treatment at a temperature above the upper limit of the above temperature range, the crystallization proceeds to an excessive extent. In this case, titanium oxide having large particle diameters is formed, and, thus, the dispersibility in water is poor.

In the production process according to the present invention, preferably, the contents of the closed vessel are heated to evaporate the solvent contained in the organic solvent-free aqueous titania sol solution, titania gel, or titania sol-gel mixture, whereby the inside of the closed vessel is pressurized at a pressure of 1.5 to 33 atmA by gas generated as a result of the evaporation of the solvent.

The pressure within the closed vessel can be controlled by the volume and the amount of the solvent within the closed vessel, and this can bring the pressure within the closed vessel to the above defined treatment pressure range. As described above, the treatment pressure should fall within the range of 1.5 to 33 atmA. When the pressure within the closed vessel is below the lower limit of the above pressure range, a lot of time is necessary for crystallization to form anatase titanium oxide. On the other hand, when the pressure within the closed vessel exceeds the upper limit of the above pressure range, special structure and equipment, such as closed vessels and sealing materials, are necessary and, in addition, extra apparatuses and equipment are necessary for the application of pressure.

Further, the introduction of pressurized insert gas into the closed vessel can also regulate the pressure within the closed vessel.

In these production processes according to the present invention, preferably, a titanium alkoxide is provided as a starting material for the production of an organic solvent-free aqueous titania sol solution, titania gel, or titania sol-gel mixture and is hydrolyzed in aqueous hydrogen peroxide or aqueous ozone and, at the same time, is dissolved in aqueous hydrogen peroxide or aqueous ozone to produce an organic solvent-free aqueous titania sol solution, titania gel, or titania sol-gel mixture.

As described above, for example, titanium alkoxides as metal organic compounds may be used as the starting material for the production of a titania sol or a titania gel. Titanium alkoxides include, for example, titanium tetramethoxide, titanium tetraethoxide, titanium isopropoxide, titanium n-propoxide, titanium tetra n-butoxide, titanium tetraisobutoxide, titanium methoxypropoxide, and titanium dichloride diethoxide.

The aqueous solvent for dissolving and hydrolyzing the starting material may be any solvent so far as the solvent is water containing a peroxide. Particularly preferred are aqueous hydrogen peroxide and aqueous ozone.

Further, in these production processes according to the present invention, preferably, at least one member selected from the group consisting of water-soluble metal salts, acidic materials, alkaline materials, organic polymers, inorganic materials, and metal alkoxides other than titanium is added to the organic solvent-free aqueous titania sol solution, titania gel, or titania sol-gel mixture.

A single water-soluble metal salt compound or a plurality of water-soluble metal salt components may be added to the starting material such as titania sol. Metal salts include acetates, nitrates, oxalates, sulfates, and chlorides. Metals contained in the metal salts include platinum, gold, silver copper, sodium, magnesium, aluminum, potassium, calcium, vanadium, chromium, manganese, cobalt, nickel, zinc, selenium, zirconium, molybdenum, palladium, tin, hafnium, and tungsten.

If necessary, acidic materials, such as hydrochloric acid, nitric acid, and acetic acid, alkaline materials, such as ammonia and amine compounds, inorganic materials, such as silica, polymethacrylic acid resins, fluororesins, organic polymers, such as aromatic organic polymers, and metal alkoxides other than titanium alkoxide may be added to the starting material, such as titania sol. Other metal alkoxides include alkoxides of aluminum, antimony, barium, bismuth, boron, calcium, cerium, cesium, chromium, copper, gallium, hafnium, iron, lithium, lutetium, magnesium, molybdenum, niobium, nickel, palladium, platinum, rhodium, samarium, silicon, silver, tungsten, vanadium, yttrium, zinc, zirconium, and th like. Further, metal akoxides may be those wherein a single or a plurality f metals may be contained in the metal alkoxides.

This technique is not limited to the production of titanium oxide, and can also be applied to the production of photocatalysts such as zinc oxide.

Third Invention

An object of the third invention is to provide a process for producing a titanium oxide coating material wherein, for example, a liquid prepared by treating a titania sol solution, a titania gel, or a titania sol-gel mixture with ozone gas is used to produce a titanium oxide coating material which can realize coating of titanium oxide having excellent photocatalytic activity at a low temperature, can be coated onto members with high adhesion strength, which can be maintained for a long period of time, and has excellent transparency which does not deteriorate the appearance of members. Another object of the third invention is to provide a process for producing a titanium oxide coating material wherein a liquid prepared by treating a titania sol solution, a titania gel, or a titania sol-gel mixture with ozone gas is mixed with titania powder or titania slurry to produce a binder that can maintain adhesion to materials having low adhesion strength for a long period of time although the photocatalytic activity is high.

In order to attain the above object, the process for producing titanium oxide coating material according to the third invention comprises the steps of: providing a titania sol solution, a titania gel, or a titania sol-gel mixture; and treating the titania sol solution, the titania gel, or the titania sol-gel mixture with ozone gas to produce a titanium oxide coating material.

Further, according to the production process of a titanium oxide coating material according to the present invention, the titania sol solution, the titania gel, or the titania sol-gel mixture may be treated with ozone gas, followed by mixing of the treated sol, gel, or sol-gel mixture with titania powder or titania slurry (at least one of titanium oxide powder, titanium oxide slurry, and a mixture thereof) to produce a titanium oxide coating material.

In these cases, for example, titanium alkoxides and titanium oxalate as metal organic compounds and titanium nitrate and titanium tetrachloride as metal inorganic compounds may be used as starting materials for the production of titania sol or titania gel. Titanium alkoxides include, for example, titanium tetramethoxide, titanium tetraethoxide, titanium isopropoxide, titanium n-propoxide, titanium tetra-n-butoxide, titanium tetraisobutoxide, titanium methoxypropoxide, and titanium dichloride diethoxide.

In these production processes according to the present invention, water, an organic solvent, or a mixture thereof, preferably, an alcohol may be contained as a solvent in the titania sol solution, the titania gel, or the titania sol-gel mixture.

The solvent for dissolving the starting material may be any organic solvent or water so far as the solvent can dissolve titania sol or titania gel. Organic solvents include alcohols, hydrocarbons, halogenated hydrocarbons, phenols, ethers, esters, and nitrogen compounds. More specific examples of organic solvents include hexane, toluene, benzene, xylene, cyclohexane, carbon tetrachloride, phenol, cresols, diethyl ether, dioxane, acetone, ethyl acetate, propyl acetate, acetonitrile, tetrahydrofuran, and pyridine. In particular, the use of alcohols having a structure represented by formula $C_nH_{2n+1}OH$ is preferred. These alcohols include, for example, methanol, ethanol, 1-propanol, isopropyl alcohol, 1-butanol, 2-butanol, isobutyl alcohol, tert-butyl alcohol, 1-pentanol, 2-pentanol, and 3-pentanol.

In the above production process according to the present invention, the starting material, for a titanium oxide coating material, after ozone treatment may be used after dilution with an organic solvent, preferably an alcohol. The alcohol used for the dilution is preferably an alcohol having a structure represented by formula $C_nH_{2n+1}OH$, particularly preferably isopropyl alcohol. Dilution with an organic solvent other than alcohols or a mixed solution composed of a plurality of organic solvents is als possibl . The dilution of the ozone-treated coating material, for example, with an alcohol is carried out from the viewpoints of improving the concentration of the coating material and the effect of inhibiting the gelation.

Further, in these production processes according to the present invention, at least one member selected from the group consisting of acidic materials, alkaline materials, surfactants, and metal alkoxides other than titanium alkoxide is preferably added to the titania sol solution, the titania gel, or the titania sol-gel mixture.

Thus, if necessary, acidic materials, such as hydrochloric acid, nitric acid, and acetic acid, alkaline materials, such as ammonia and amine compounds, surfactants, and metal alkoxides other than titanium alkoxides may be added to the starting material, such as titania sol.

Other metal alkoxides include alkoxides of aluminum, antimony, barium, bismuth, boron, calcium, cerium, cesium, chromium, copper, gallium, hafnium, iron, lithium, lutetium, magnesium, molybdenum, niobium, nickel, palladium, platinum, rhodium, samarium, silicon, silver, tungsten, vanadium, yttrium, zinc, zirconium and the like. Further, metal akoxides may be those wherein a single or a plurality of metals may be contained in the metal alkoxides.

BEST MODE FOR CARRYING OUT THE INVENTION

First Invention

Figure 1:
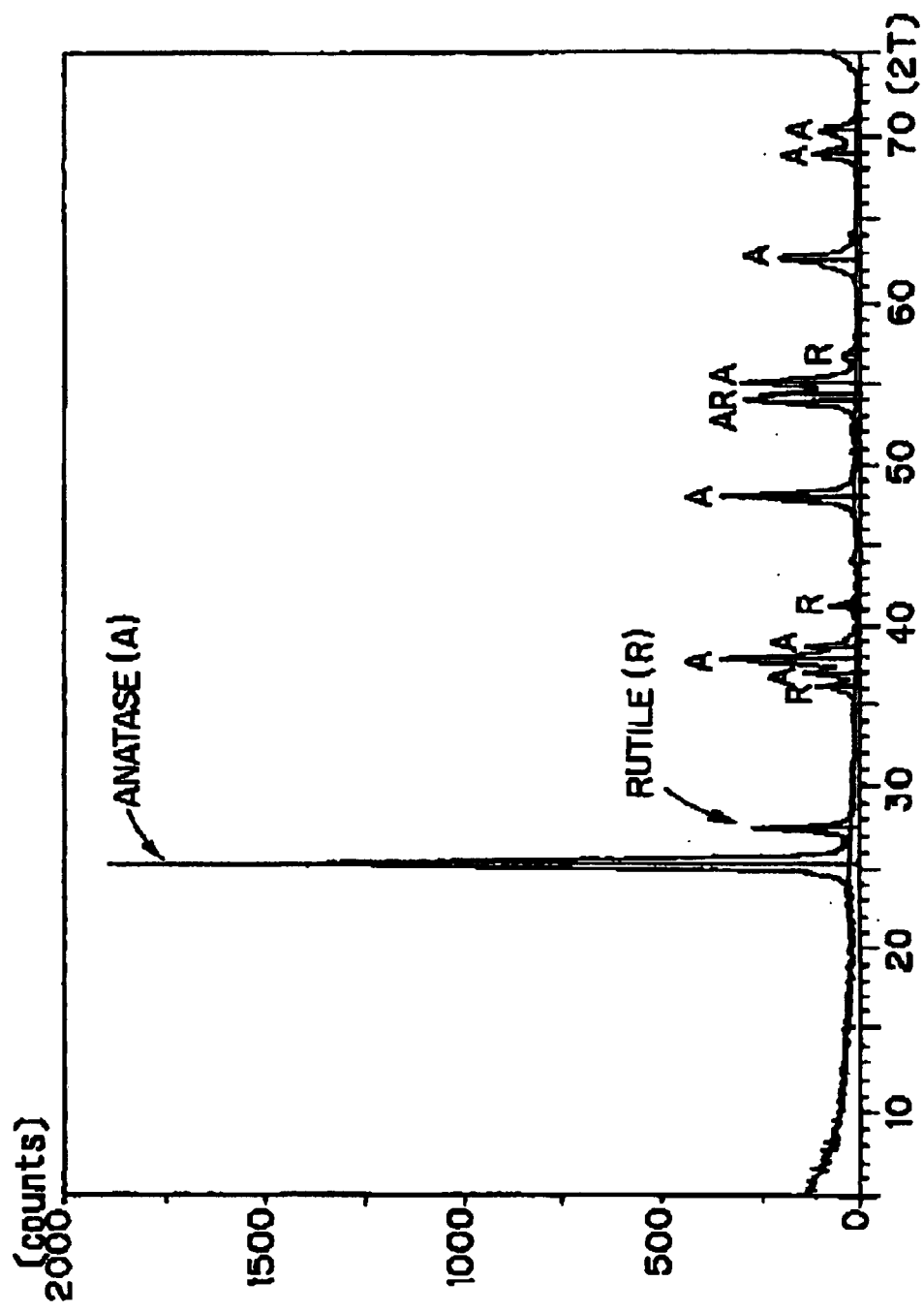
FIG. 1 is a diagram showing the results of the analysis of a crystal structure by X-ray diffractometry (XRD) of titanium oxide (P-25) in an example of the present invention.

Embodiments of the first invention will be described. In the embodiments of the first invention, for example, a titania sol is used as a starting material, and an alcohol having a structure repr sented by formula $C_nH_{2n+1}OH$ is used as a solvent for dissolving the titania sol. A titania gel or a titania sol-gel mixture may be of course used as a starting material. Further, other solvent may also be of course used so far as the solvent can dissolve the titania sol or the titania gel.

Starting materials usable for the production of a titania sol include, for example, metal organic compounds, for example, metal alkoxides and titanium oxalate, and metal inorganic compounds, for example, titanium nitrate and titanium tetrachloride. Metal alkoxides include titanium tetramethoxide, titanium tetraethoxide, titanium isopropoxide, and titanium tetrabutoxide.

Solvents usable for dissolving the starting material or the titania sol include, for example, methanol, ethanol, 1-propanol, isopropyl alcohol, 1-butanol, 2-butanol, isobutyl alcohol, tert-butyl alcohol, 1-pentanol, 2-pentanol, and 3-pentanol.

A titania sol solution composed of the above starting material (for example, metal alkoxide) and the solvent is prepared. The titania sol solution is placed in a closed vessel, and is heat treated in the temperature range of 80 to 250° C. In the preparation of the titania sol, if necessary, acidic materials, such as hydrochloric acid, nitric acid, and acetic acid, alkaline materials, such as ammonia and amine compounds, inorganic materials, such as silica, polymethacrylic acid resins, fluororesins, aromatic organic polymers and the like may be added.

Holding with heating within the closed vessel results in the evaporation of the solvent used in the preparation of the titania sol solution, and solvent gas produced by the evaporation pressurizes the inside of the closed vessel. The treatment pressure within the closed vessel is regulated so that the lower limit of the pressure is 1.5 atmA, preferably 5 atmA, while the upper limit is 350 atmA, preferably 60 atmA. In this case, the pressure can be controlled by the volume and the amount of the solvent within the closed vessel. Further, the pressure within the closed vessel can also be regulated to the above pressure range by introducing inert gas, such as nitrogen gas, into the closed vessel at the time of heat treatment.

A liquid containing anatas titanium oxide is produced via two steps, i.e., the step of preparing a titania sol and the step of heat treatment. At that time, the fine particles of anatase titanium oxide settle at the bottom of the solvent, and the solvent is evaporated and removed at a temperature of about 100° C. to produce anatase titanium oxide powder which develops high photocatalytic activity. In this case, the solvent after the treatment can be recovered without substantial loss. The resultant anatase titanium oxide powder has a large specific surface area of 50 to 100 $m^2/g$. The specific surface area may be measured, for example, by the HET method.

Further, the fine particles of anatase titanium oxide partially settle at the bottom of the solvent. Therefore, ultrasonic dispersion can realize the dispersion of titanium oxide particles, which are settling, in the solution to produce anatase titanium oxide slurry which is very stable at room temperature and is free from the settling of titanium oxide particles. Thus, the titanium oxide particles as such can be dispersed in the solvent which has been used in the preparation of the titania sol. Mechanical agitation, ultrasonic dispersion and the like may be used for stirring. The resultant anatase titanium oxide slurry can be coated as a coating material having excellent photocatalytic activity at a temperature of about 100° C.

Second Invention

Embodiments of the second invention will be described. For example, an embodiment will be described wherein a titanium alkoxide is used as a starting material for the production of an aqueous titania sol solution and aqueous hydrogen peroxide is used as a solvent for dissolving and hydrolyzing the starting material. However, the starting material and the solvent are not limited to these only. Titanium alkoxides include, for example, titanium tetramethoxide, titanium tetraethoxide, titanium isopropoxide, titanium n-propoxide, titanium tetra-n-butoxide, titanium tetraisobutoxide, titanium methoxypropoxide, and titanium dichloride diethoxide. The solvent may be any solvent so far as the solv nt is water containing a peroxid . Further, preferably, in addition to aqueous hydrogen peroxide, for example, aqueous ozone may be used.

At the outset, the titanium alkoxid is hydrolyzed with water contained in aqueous hydrogen peroxide (for example, concentration 30% by weight) to produce amorphous titanium oxide which is instantaneously dissolved in aqueous hydrogen peroxide to prepare an aqueous titania sol solution. In this case, at the time of the preparation of the titania sol, a single water-soluble metal salt component or a plurality of water-soluble metal salt components may be added. Metal salts include acetates, nitrates, oxalates, sulfates, and chlorides. Metals contained in the metal salts include platinum, gold, silver copper, sodium, magnesium, aluminum, potassium, calcium, vanadium, chromium, manganese, cobalt, nickel, zinc, selenium, zirconium, molybdenum, palladium, tin, hafnium, and tungsten. If necessary, acidic materials, such as hydrochloric acid, nitric acid, and acetic acid, alkaline materials, such as ammonia and amine compounds, inorganic materials, such as silica, polymethacrylic acid resins, fluororesins, organic polymers, such as aromatic organic polymers, and metal alkoxides other than titanium alkoxide may also be added. For other metal alkoxides, simultaneous or separate hydrolysis may also be possible in such a manner that a titanium alkoxide is hydrolyzed with water contained in aqueous hydrogen peroxide.

Next, the resultant aqueous titania sol solution is heat treated within a closed vessel to prepare an anatase titanium oxide-containing liquid from which powder composed mainly of anatase titanium oxide capable of developing photocatalytic activity and aqueous titanium oxide slurry containing the same are produced. As described above, the temperature, at which the contents of the closed vessel are heated, is preferably 120 to 270° C., more preferably 150 to 240° C., because the solvent (water), which has dissolved the starting material, should be vaporized in a closed vessel. Holding with heating within the closed vessel results in the evaporation of the solvent used in the preparation of the aqueous titania sol solution, and solvent gas produced by the evaporation pressurizes the inside of the closed vessel. In this case, the pressure within the closed vessel can be controlled by the volume and the amount of the solvent of the closed vessel. This permits the pressure to be regulated in the above pressure range of 1.5 to 33 atmA. Further, the pressure within the closed vessel can also be regulated to the above pressure range by introducing inert gas, such as nitrogen gas, into the closed vessel at the time of heat treatment.

Anatase titanium oxide may be produced via two steps, i.e., the step of preparing a titania sol and the step of heat treatment. A heat treatment temperature of 270° C. or below, preferably 240° C. or below, results in the production of anatase titanium oxide powder and aqueous slurry containing the same.

In this case, when the production of powdery anatase titanium oxide is contemplated, evaporation and removal of water from the anatase titanium oxide-containing liquid at a temperature of about 100° C. can realize the production of anatase titanium oxide powder having high photocatalytic activity. Since the liquid to be treated does not contain any organic solvent, any organic solvent vapor is not generated at the time of drying. The resultant anatase titanium oxide powder has a high specific surface area of 50 to 100 m²/g. The specific surface area may be measured, for example, by the BET method.

Further, the fine particles of anatase titanium oxide after the treatment partially settle at the bottom of the solvent, and stirring (ultrasonic dispersion being also possible) in the solvent used in the preparation of the titania sol can realize the production of aqueous anatase titanium oxide slurry which is very stable at room temperature and is free from the settling of titanium oxide particles. Thus, the titanium oxide particles as such can be dispersed in the solvent which has been used in the preparation of the titania sol. The resultant aqueous anatase titanium oxide slurry can be coated as a coating material having excellent photocatalytic activity at a temperature of 200° C. or below, specifically about 100° C. Since the dispersion is aqueous, coating is possible without the generation of any organic solvent in the step of drying.

Third Invention

Embodiments of the third invention will be described. In the embodiments of the third invention, for example, a titania sol is used as a starting material, and an alcohol having a structure represented by formula $C_nH_{2n+1}OH$ is used as a solvent for dissolving the titania sol. A titania gel or a titania sol-gel mixture may be of course used as the starting material. Further, other organic solvent and water may also be of course used so far as the solvent can dissolve the titania sol or the titania gel.

Starting materials usable for the production of a titania sol include, for example, metal organic compounds, for example, titanium alkoxides and titanium oxalate, and metal inorganic compounds, for example, titanium nitrate and titanium tetrachloride. Titanium alkoxides include titanium tetramethoxide, titanium tetraethoxide, titanium isopropoxide, titanium n-propoxide, titanium tetra-n-butoxide, titanium tetraisobutoxide, titanium methoxypropoxide, and titanium dichloride diethoxide.

Solvents usable for dissolving the starting material or the titania sol include, for example, methanol, ethanol, 1-propanol, isopropyl alcohol, 1-butanol, 2-butanol, isobutyl alcohol, tert-butyl alcohol, 1-pentanol, 2-pentanol, and 3-pentanol.

A liquid prepared by treating, with ozone gas, titanium hydroxide prepared by the hydrolysis of, for example, a titanium alkoxide among the above starting materials can be used as or in a titanium oxide coating material which can be coated at a low temperature and, at the same time, has excellent adhesion and transparency.

Methods for the production of ozone gas, which is passed through the titania sol, include a method wherein ozone gas is produced by silent discharge of oxygen gas or clean air, a method wherein dilute sulfuric acid is electrolyzed with water or at a low temperature, a method wherein liquid oxygen is heated, and a method wherein ultraviolet light is applied to air. According to the present invention, any of the above methods may be used.

The temperature of the titania sol, at which ozone gas is passed, may be about 25° C. Alternatively, heating or cooling may be carried out.

If necessary, acidic materials, such as hydrochloric acid, nitric acid, and acetic acid, alkaline materials, such as ammonia and amine compounds, surfactants, and metal alkoxides other than titanium alkoxides may be added to the titania sol. For other metal alkoxides, simultaneous or separate hydrolysis may also be possible in such a manner that a titanium alkoxide is hydrolyzed.

The liquid, which has been treated with ozone, as such may be coated for use as a photocatalyst. Alternatively, the liquid may be mixed with anatase titanium oxide powder and/or slurry with anatase titanium oxide dispersed therein to increase the catalytic activity. Thus, the liquid, which has been treated with ozone, as such may be utilized as a photocatalyst and, in addition, may be mixed with previously prepared anatase titanium oxide powder or slurry to increase the activity.

The anatase titanium oxide slurry, which is separately added to increase the activity, may be produced, for example, by heat treating a titania sol solution, a titania gel, or a titania sol-gel mixture in a closed vessel in the temperature range of 80 to 250° C. (preferably at a temperature of 240° C. or below). A specific one example of the production process of the anatase titanium oxide slurry is to heat treat a titania sol, prepared by adding a minor amount of water to titanium isopropoxide in isopropyl alcohol, in a closed vessel in the temperature range of 80 to 250° C. The production process of the titania powder and the titania slurry is not limited to any process, and the coating material produced by the production process according to the present invention may be mixed and used with any titania powder, titania slurry or the like.

Further, the coating material can be used as a binder for enhancing fixation strength of photocatalysts other than titanium oxide, for example, ZnO and CdS.

Furthermore, a method may also be used wherein a binder is produced within the slurry by passing ozone gas through anatase titanium oxide slurry, produced by heat treating a titania sol solution, a titania gel, or a titania sol-gel mixture in a closed vessel in the temperature range of 80 to 250° C. (preferably at a temperature of 240° C. or below), to treat the anatase titanium oxide slurry with ozone. A specific one example thereof is such that a titania sol prepared by adding a minor amount of water to titanium isopropoxide in isopropyl alcohol is heat treated in a closed vessel in the temperature range of 80 to 250° C. to produce anatase titanium oxide slurry which is then treated with ozone, whereby a binder for improving the adhesion strength is produced.

The liquid after ozone treatment may be used after dilution with an organic solvent such as an alcohol. For example, when the dilution with isopropyl alcohol is carried out, titanium oxide coating may be carried out at a low temperature of 110° C. or below. The dilution ratio may be regulated according to members to be coated because the coating thickness can be regulated by varying the dilution ratio.

Members coatable with the titanium oxide coating material according to the present invention may be any of inorganic materials, organic materials, and metals. They may be used solely or as a composite of two or more. The coating material can be coated at a low temperature, for example, at 110° C. or below, independently of the surface profile of the member. Furthermore, drying by exposure to sunlight may be adopted instead of heat treatment to fix the coating.

Inorganic materials include glasses, earthenwares, cements, ceramics, sands, or fibers formed from inorganic materials. Organic materials include thermoplastic resins, such as polyethylene, ABS, polypropylene, polymethyl methacrylate, and fluororesins, thermosetting resins, such as epoxy resins and polyurethanes, FRP, and rubbers. Metal materials, such as aluminum, iron, and copper, and a metal composite material using them, may be coatable without any limitation with the coating material produced according to the present invention.

Any of brush coating, spray coating, spin coating, dip coating and the like may be used for coating of the coating material produced according to the production process of the present invention.

EXAMPLES

The following examples and comparative examples further illustrate the present invention.

Example A1

Titanium isopropoxide (14.96 g) was dissolved in 50 ml of isopropanol to prepare a titanium isopropoxide solution. A previously prepared mixture composed of 2.5 ml of 2 N hydrochloric acid, 3 ml of water, and 94.5 ml of isopropanol was added dropwise at a rate of 10 ml per min for 5 min, that is, in an amount of 50 ml, to the titanium isopropoxide solution. The molar ratio of titanium isopropoxide:water:hydrochloric acid in the titania sol solution thus obtained was 1:3:0.05.

Figure 2:
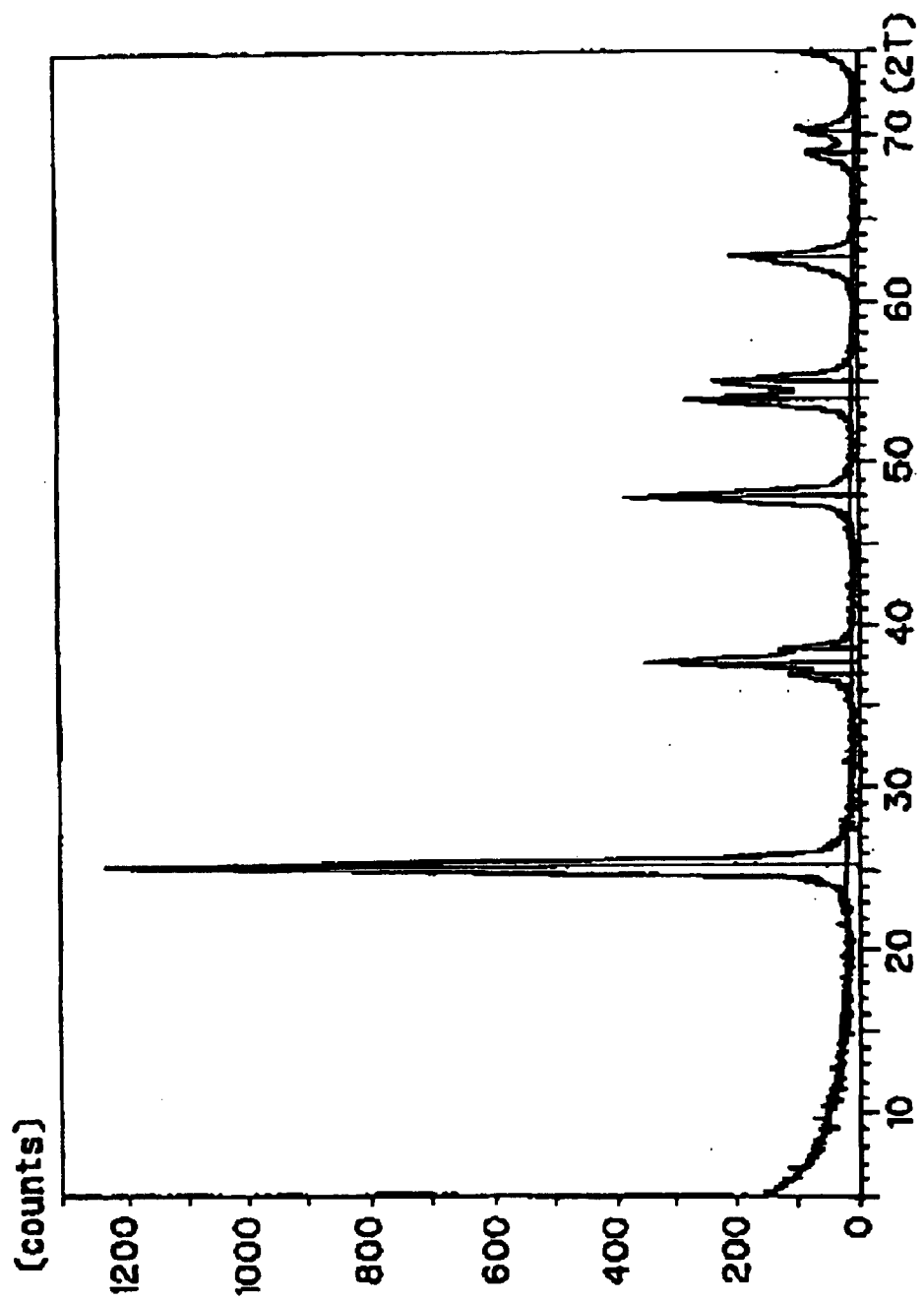
FIG. 2 is a diagram showing the results of the analysis of a crystal structure by X-ray diffractometry (XRD) of titanium oxide in Example A1 of the present invention.

The transparent titania sol (50 g) was placed in a 100-ml vessel, and was held at 240° C. for 6 hr under hermetically sealed conditions. At that time, the pressure within the closed vessel was increased to 53 atmA. After the treatment, the resultant white powder was dried at 110° C., and the crystal structure thereof was then analyzed by X-ray diffractometry (XRD). As a result, as shown in FIG. 2, the crystal exhibited the same diffraction peak as P-25 (manufactured by Nippon Aerosil Co., Ltd.) of which the results of XRD analysis are shown in FIG. 1, one of anatase titanium oxides, indicating that anatase titanium oxide was produced.

This anatase titanium oxide had a specific surface area of 67 $m^2/g$ (BET method). The powder contained titanium oxide at a yield of not less than 98%, and the solvent loss after the heat treatment was 0.3%.

Comparative Example A1

The titania sol prepared in Example A1 was held at room temperature under atmospheric pressure without the heat treatment in the closed vessel. As a result, the viscosity of the solution increased with the elapse of time, and, five hr after the initiation of the holding, a transparent gel was formed. Even after further standing, the transparent gel remained unchanged, and white powder was not formed.

Figure 3:
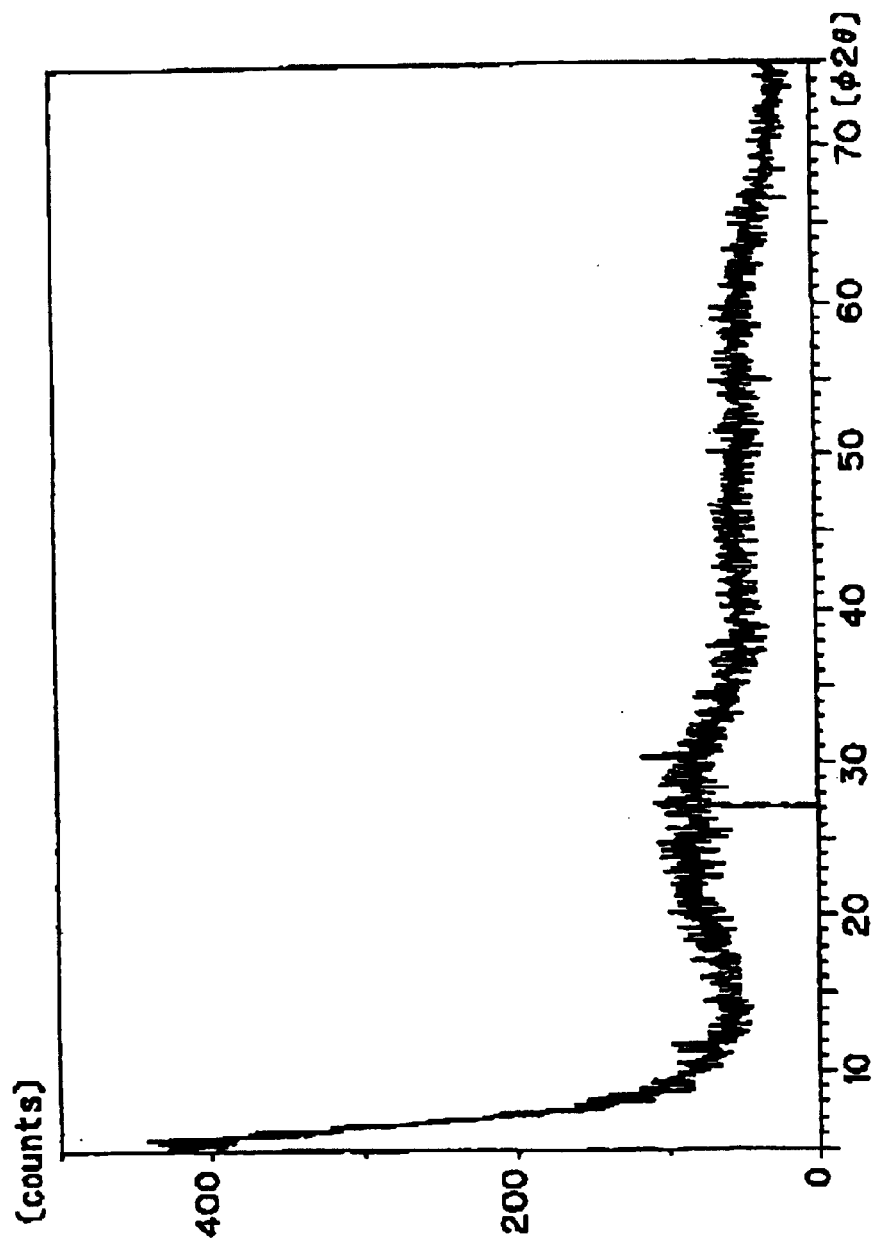
FIG. 3 is a diagram showing the results of the analysis of a crystal structure by X-ray diffractometry (XRD) of titanium oxide in Comparative Example A1.

Separately, immediately after the preparation of the titania sol in Example A1, the titania sol was treated and dried at 110° C. under atmospheric pressure for 5 hr to prepare white powder. This white powder was analyzed by X-ray diffractometry (XRD). As a result, as shown in FIG. 3, the white powder had an amorphous structure.

Figure 4:
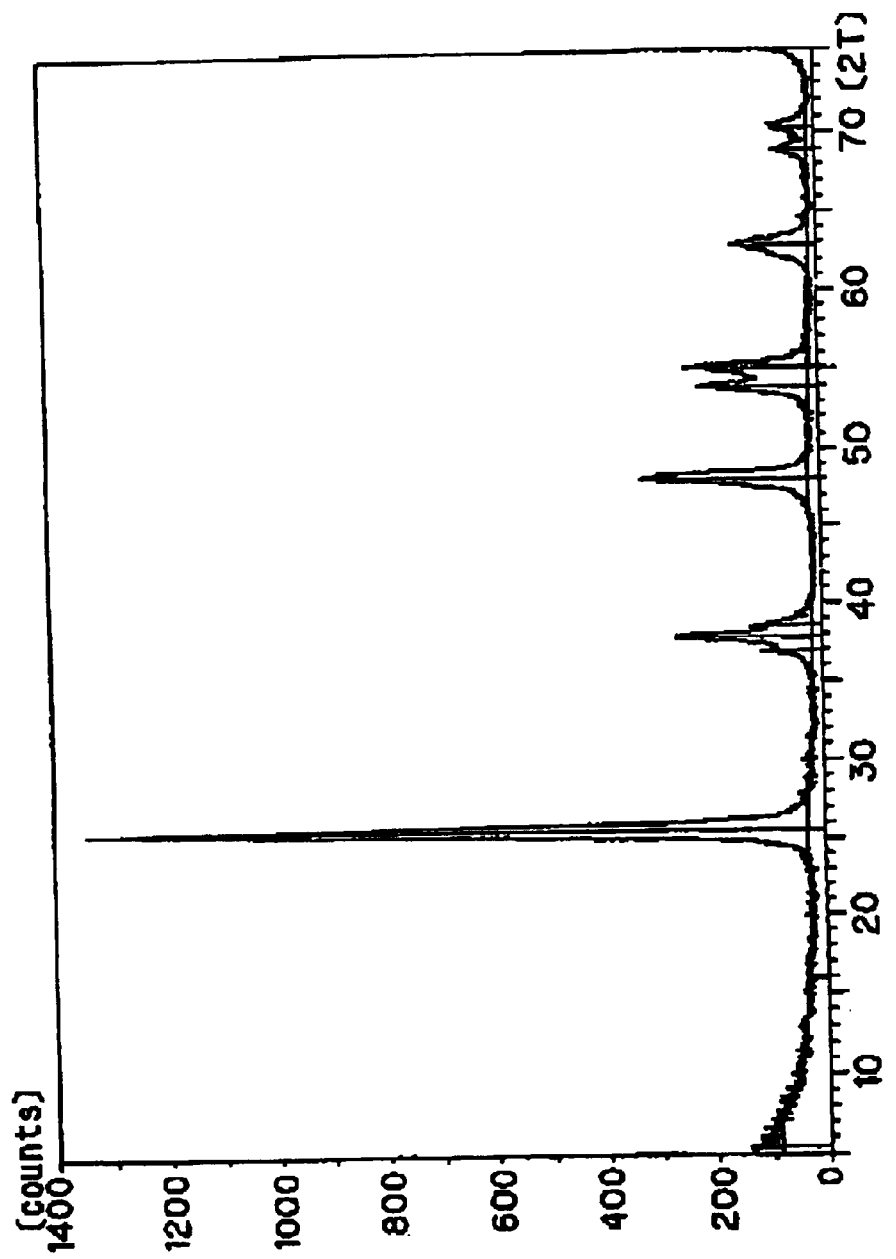
FIG. 4 is a diagram showing the results of the analysis of a crystal structure by X-ray diffractometry (XRD) of titanium oxid in Comparative Exampl A1.

Separately, the titania sol prepared in Example A1 was treated at 400° C. under atmospheric pressure. As a result, anatase titanium oxide was produced. The results of analysis by XRD are shown in FIG. 4. The powder, however, was slightly grayish due to the presence of the residual organic material.

Example A2

Figure 5:
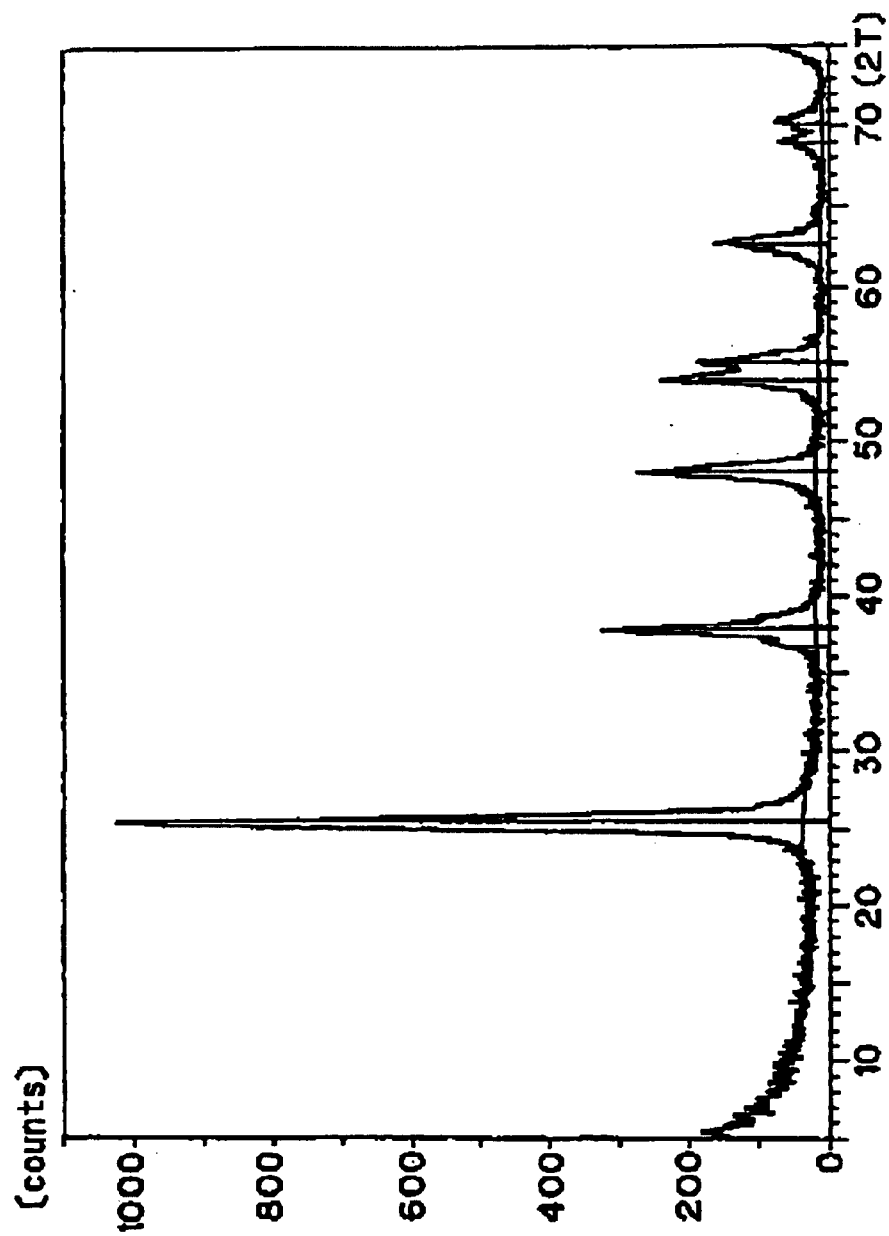
FIG. 5 is a diagram showing the results of a test on the decomposition of acetaldehyde by a coating material prepared in Example A3.

The transparent titania sol (50 g) prepared in Example A1 was placed in a 100-ml vessel, and was treated at 150° C. under hermetically sealed conditions for 6 hr. As a result, white powder was produced. As shown in FIG. 5, the analysis of this powder by X-ray diffractometry (XRD) revealed that anatase titanium oxide was produced.

Example A3

A liquid containing fine particles of anatase titanium oxide produced by the heat treatment under hermetically sealed conditions in Example A1 was treated in an ultrasonic washer (high frequency output 65 W) for 10 min to disperse the titanium oxide particles, which had been in the settled state, in the solution. The pH value of the resultant dispersion (slurry) was 4.9. This dispersion of anatase titanium oxide, even when allowed to stand for not less than 20 days, did not cause settling, and the anatase titanium oxide remained very stably dispersed.

The dispersion (slurry) was coated on the inner surface of a one-liter separable flask made of glass, and the coating was dried at 110° C. for 30 min. The amount of titanium oxide coated on the inner surface of the separable flask was 0.25 g. The titanium oxide coating within the separable flask was exposed to light emitted from a low-pressure mercury lamp (10 W) to evaluate the decomposition of 500 ppm of acetaldehyde. The results are shown in FIG. 6.

Figure 6:
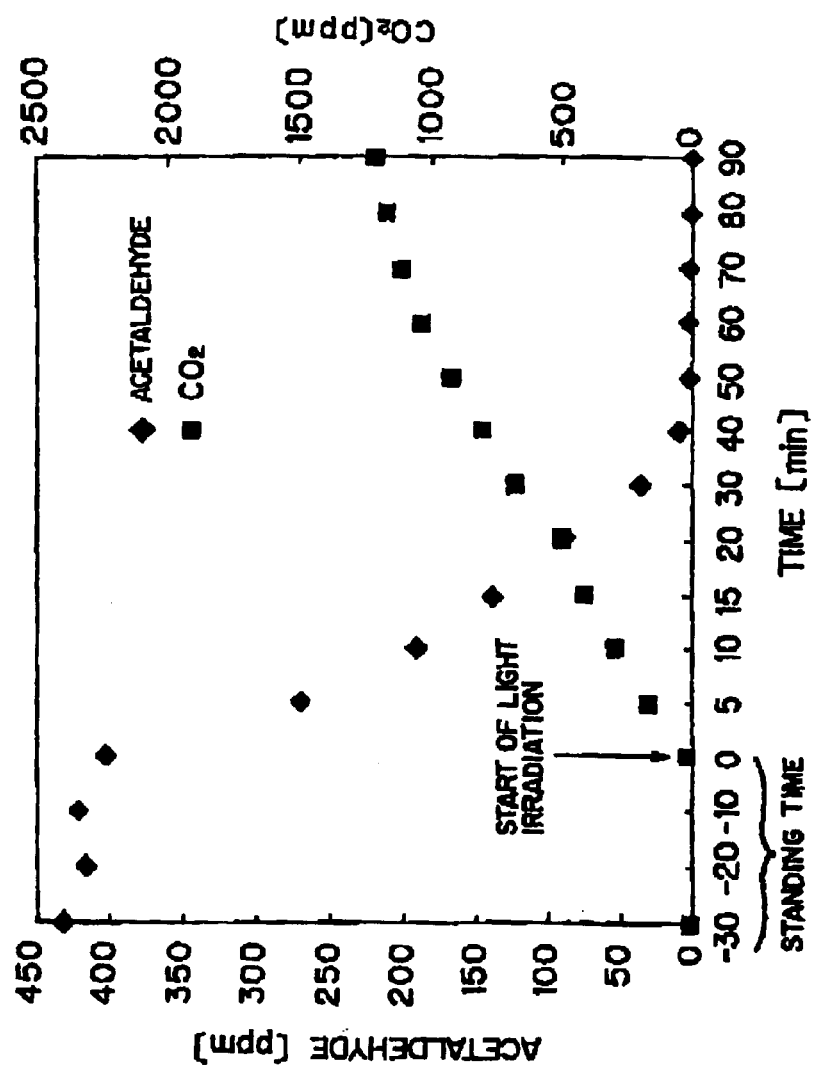

When light from the mercury lamp was not applied to the titanium oxide coating, although the amount of acetaldehyde was reduced by an amount of acetaldehyde adsorbed on titanium oxide present on the inner surface of the flask at the time of injection of acetaldehyde into the flask, the acetaldehyde concentration remained unchanged from that at the time of the injection (corresponding to −30 min to 0 min in FIG. 6). On the other hand, the application of light from the mercury lamp reduced the concentration of acetaldehyde within the flask, and the whole quantity of acetaldehyde disappeared about 40 min after the initiation of the light irradiation. Further, analysis was carried out for carbon dioxide (decomposition product of acetaldehyde) within the flask. As a result, it was found that, simultaneously with the application of light from the mercury lamp, the concentration of carbon dioxide within the flask increased.

The above results show that acetaldehyde was decomposed and removed by anatase titanium oxide having photocatalytic activity.

Conditions for X-ray diffraction and conditions for the measurement of gas concentration in the examples and comparative examples described above are as follows.
(1) Conditions for X-ray diffraction
   X-ray apparatus: Model PW 3050 manufactured by Phillips Japan, Ltd.
   X-ray source: Cu Kα radiation
   Output: tube voltage 40 kV, tube current 30 mA
   Scanning: θ/2θ scan
   Scanning range (diffraction angle 2θ): 5° to 75°
   Scanning speed: 0.05° (2θ/sec)
   Detector: proportional counter
(2) Conditions for measurement of gas concentration
   Acetaldehyde: GC-FID (hydrogen flame ionization detector) type (Shimadzu GC-14B)
   Column: DB-WAX (diameter 0.25 μm, length 30 m)
   Flow rate of carrier gas: 41 ml/min (He)
   Split ratio: 1/40 (makeup gas: He)
   Column temp.: 100° C.
   Injection temp.: 230° C.
   Detector temp.: 250° C.
   $CO_2$: GC-FID (hydrogen flame ionization detector) type (Shimadzu GC-14A)
   Pretreatment at 400° C. in methanizer (MTN-1)
   Column: Porapack Q
   Flow rate of carrier gas: 50 ml/min (hydrogen)
   Column temp.: 50° C.
   Injection temp.: 100° C.
   Detector temp.: 100° C.

The first invention having the above constitution has the following effects.
(1) Heat treatment of a titania sol, a titania gel, or a titania sol-gel mixture in a closed vessel under pressure can realize the production of anatase titanium oxide powder having high photocatalytic activity and slurry containing the same at a low heat treatment temperature of 250° C. or below.
(2) Anatase titanium oxide can be produced through two steps, the step of preparing a starting material and the step of heat treatment. That is, the production process involves a small number of steps and is simple.
(3) When the production of powdery titanium oxide is contemplated, what is required after the heat treatment is only to evaporate and remove the solvent at a temperature of about 100° C. The resultant anatase titanium oxide powder has a specific surface area of 50 to 100 $m^2/g$, that is, has a high specific surface area.
(4) The solvent used in the dissolution of the starting material of titanium oxide can be recovered without any loss after the heat treatment, and, in addition, can be used as a solvent for dispersion of the resultant anatase titanium oxide particles to produce a slurry.
(5) Anatase titanium oxide after the heat treatment is present as fine particles at the bottom of the solvent. In this case, ultrasonic dispersion treatment (mechanical agitation being also possible) in the solvent used in the preparation of the starting material can realize the production at room temperature of anatase titanium oxide slurry which is very stable and is free from settling of titanium oxide particles.
(6) The resultant anatase titanium oxide slurry has very high storage stability and dispersibility, can be coated, at a temperature of about 100° C., as a coating material having excellent photocatalytic activity, and can also be coated on the surface of materials having low heat resistance. Further, sunlight may be used as alternative drying means.

Example B1

Titanium isopropoxide (9.36 g) was placed in 50 ml of aqueous hydrogen peroxide (concentration 30 wt %) to perform hydrolysis. Ten min after the initiation of the hydrolysis, 450 ml of aqueous hydrogen peroxide was further added, and the system was allowed to stand for 3 hr to perform hydrolysis. Thus, a liquid of a transparent yellow titania sol was prepared.

Figure 7:
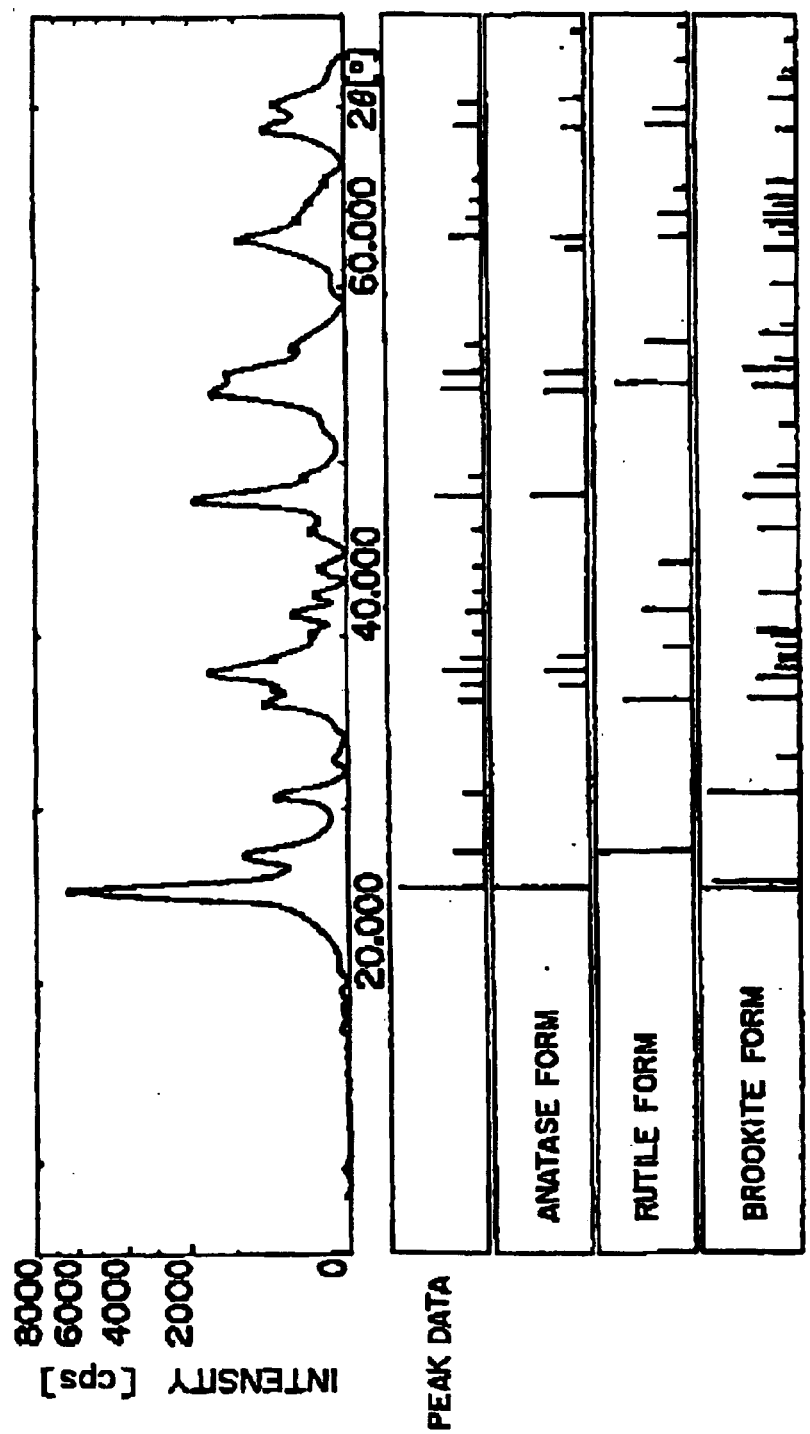
FIG. 7 is a diagram showing the analytical results and analytical data of a crystal structure obtained by X-ray diffractometry (XRD) of titanium oxide in Example B1 of the present invention.

This sol was dried at 110° C. for 30 min to prepare yellow powder of which the crystal structure was then analyzed by X-ray diffractometry (XRD). As a result, as shown in FIG. 7, the powder contained four types of titanium oxide, i.e., anatase, rutile, brookite, and amorphous. The content of hydrogen peroxide contained in the yellow sol was 0.004% by weight.

On the other hand, 50 g of the transparent yellow titania sol was placed in a 100-ml vessel, and was held at 240° C. for 3 hr under hermetically sealed conditions. At that time, the pressure within the closed vessel rose to 33 atmA. The content of hydrogen peroxide contained in the slurry after the treatment was 0% by weight.

Figure 8:
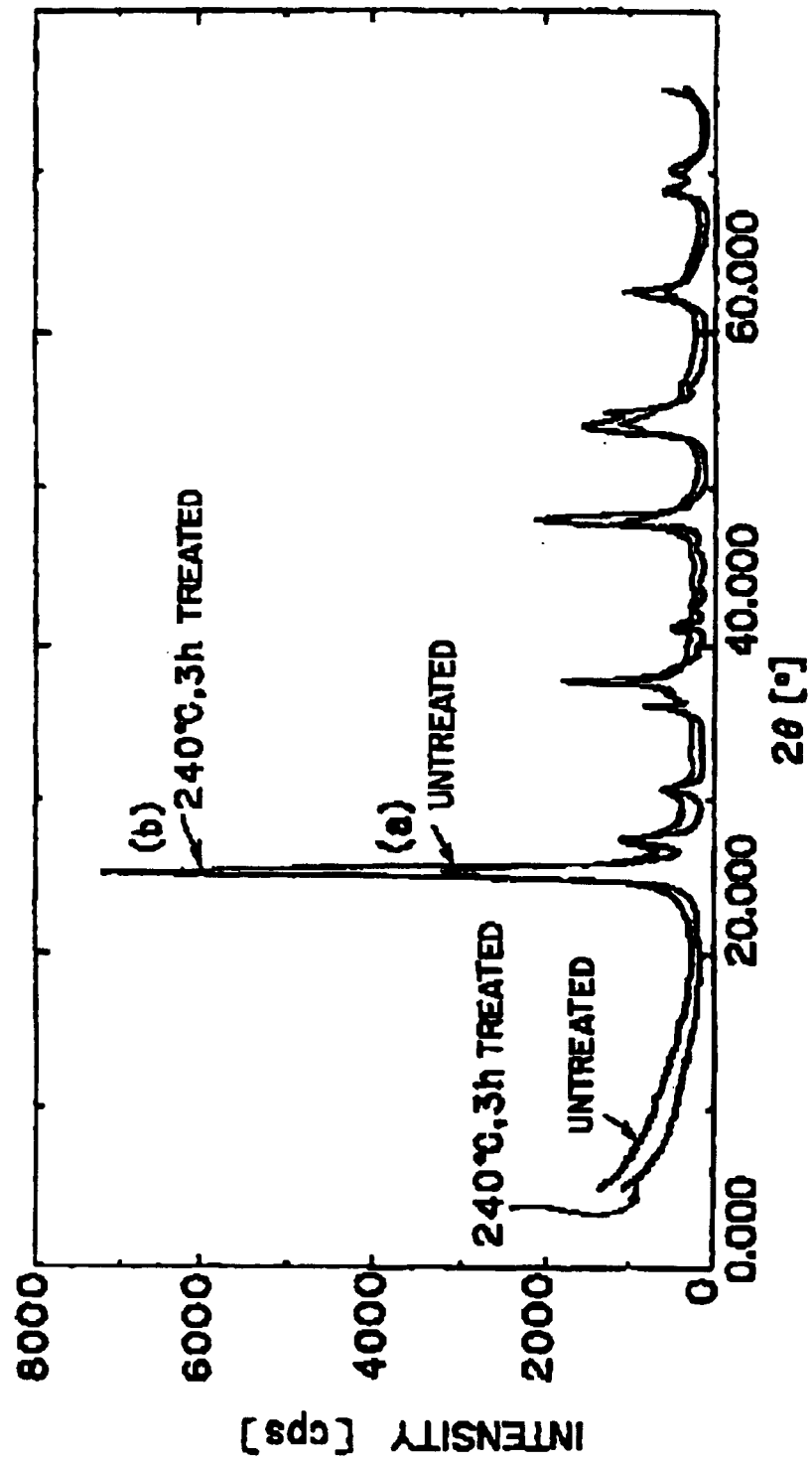
FIG. 8 is a diagram showing the results of the analysis of a crystal structure by X-ray diffractometry (XRD) of titanium oxide in Example B1 of the present invention.

White powder obtained after the treatment was dried at 110° C. for 30 min, and the crystal structure thereof was then analyzed by X-ray diffractometry (XRD). As a result, as shown in FIG. 8, in the resultant crystal, the amorphous titanium oxide has been converted to anatase titanium oxide, and titanium oxide composed mainly of anatase titanium oxide was obtained. The powder contained titanium oxide at a yield of not less than 98%, and the solvent loss after the heat treatment was 0.3%.

The dispersion after the treatment was coated on the inner surface of a one-liter separable flask made of glass, and the coating was dried at 110° C. for 30 min. The amount of titanium oxide coated on the inner surface of the separable flask was 0.25 g. The titanium oxide coating within the separable flask was exposed to light emitted from a low-pressure mercury lamp (10 W) to evaluate the decomposition of 500 ppm of acetaldehyde. The results are shown in FIG. 9.

Figure 9:
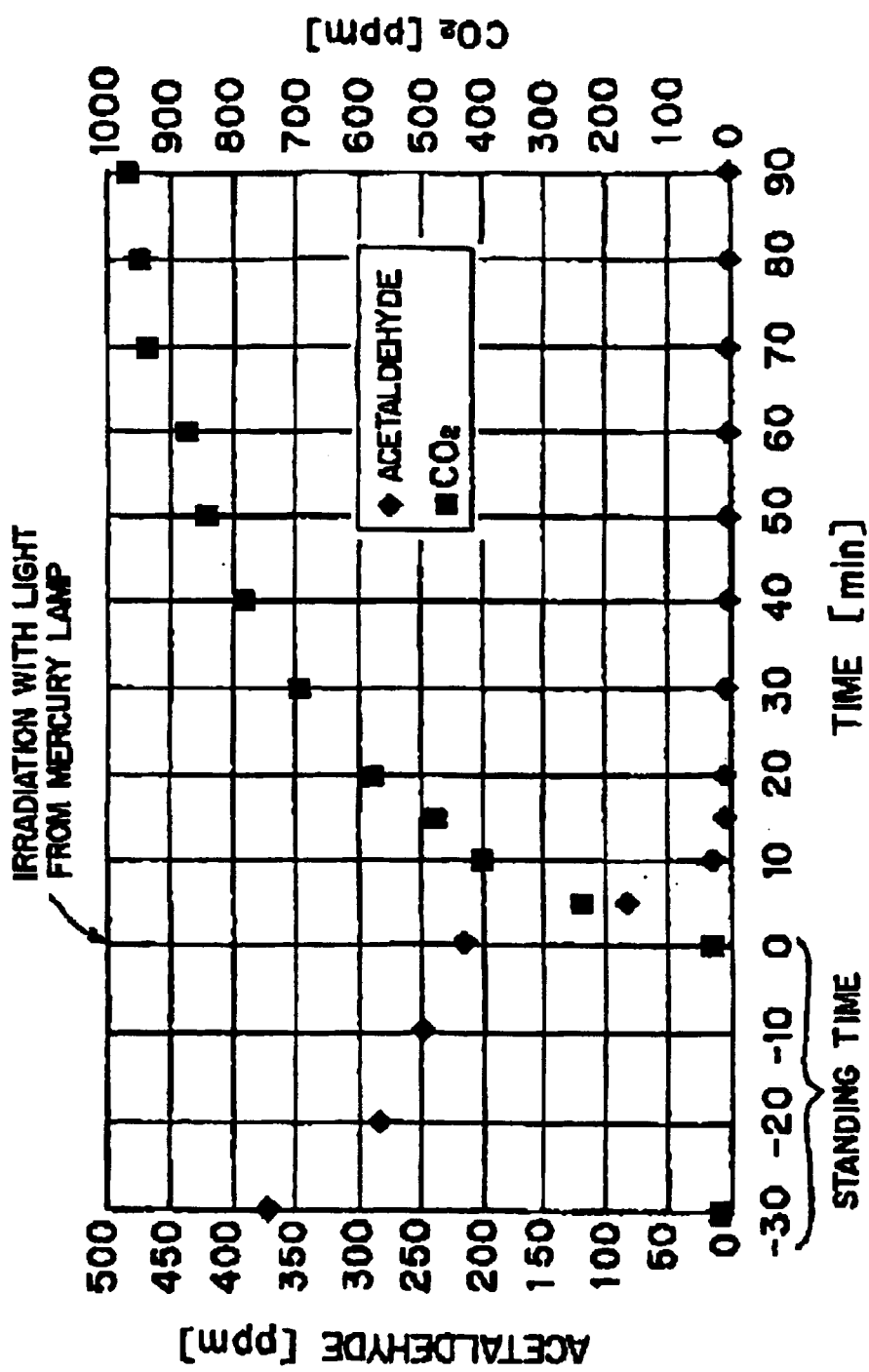
FIG. 9 is a graph showing the results of a test on the decomposition of acetaldehyde by a coating material prepared in Example B1.

When light from the mercury lamp was not applied to the titanium oxide coating, 30 min after the injection, the concentration of acetaldehyde contained in the gas within the flask was lowered to 200 ppm (corresponding to −30 min to 0 min in FIG. 9). This reduction corresponds to an amount of acetaldehyde adsorbed on titanium oxide present on the inner surface of the flask at the time of injection of gas into the flask. On the other hand, the application of light from the mercury lamp reduced the concentration of acetaldehyde in the gas within the flask, and the whole quantity of acetaldehyde disappeared about 15 min after the initiation of the light irradiation. Further, analysis was carried out for carbon dioxide (decomposition product of acetaldehyde) within the flask. As a result, it was found that, although the evolution of carbon dioxide was not observed before the application of light from the mercury lamp, simultaneously with the application of light from the mercury lamp, the concentration of carbon dioxide within the flask increased.

The above results show that acetaldehyde was decomposed and removed by anatase titanium oxide having photocatalytic activity.

Example B2

Figure 10:
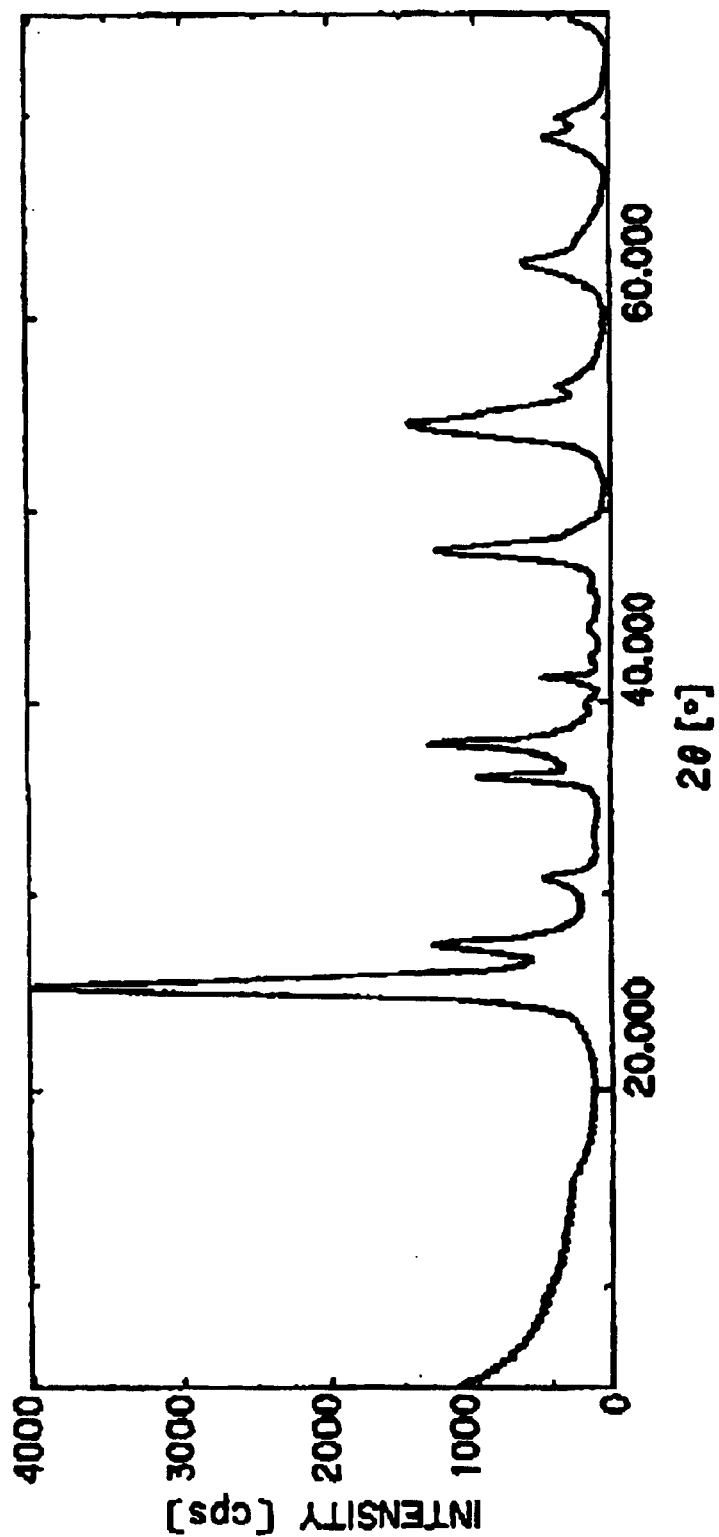
FIG. 10 is a diagram showing the results of the analysis of a crystal structure by X-ray diffractometry (XRD) of titanium oxide in Example B2 of the present invention.

The transparent yellow titania sol (50 g) prepared in Example B1 was placed in a 100-ml vessel, and was treated at 120° C. under hermetically sealed conditions for 3 hr. At that time, the pressure within the closed vessel rose to 1.5 atmA. As a result, white powder was produced. As shown in FIG. 10, the analysis of this powder by X-ray diffractometry (XRD) revealed that the powder was composed mainly of anatase titanium oxide.

Example B3

Figure 11:
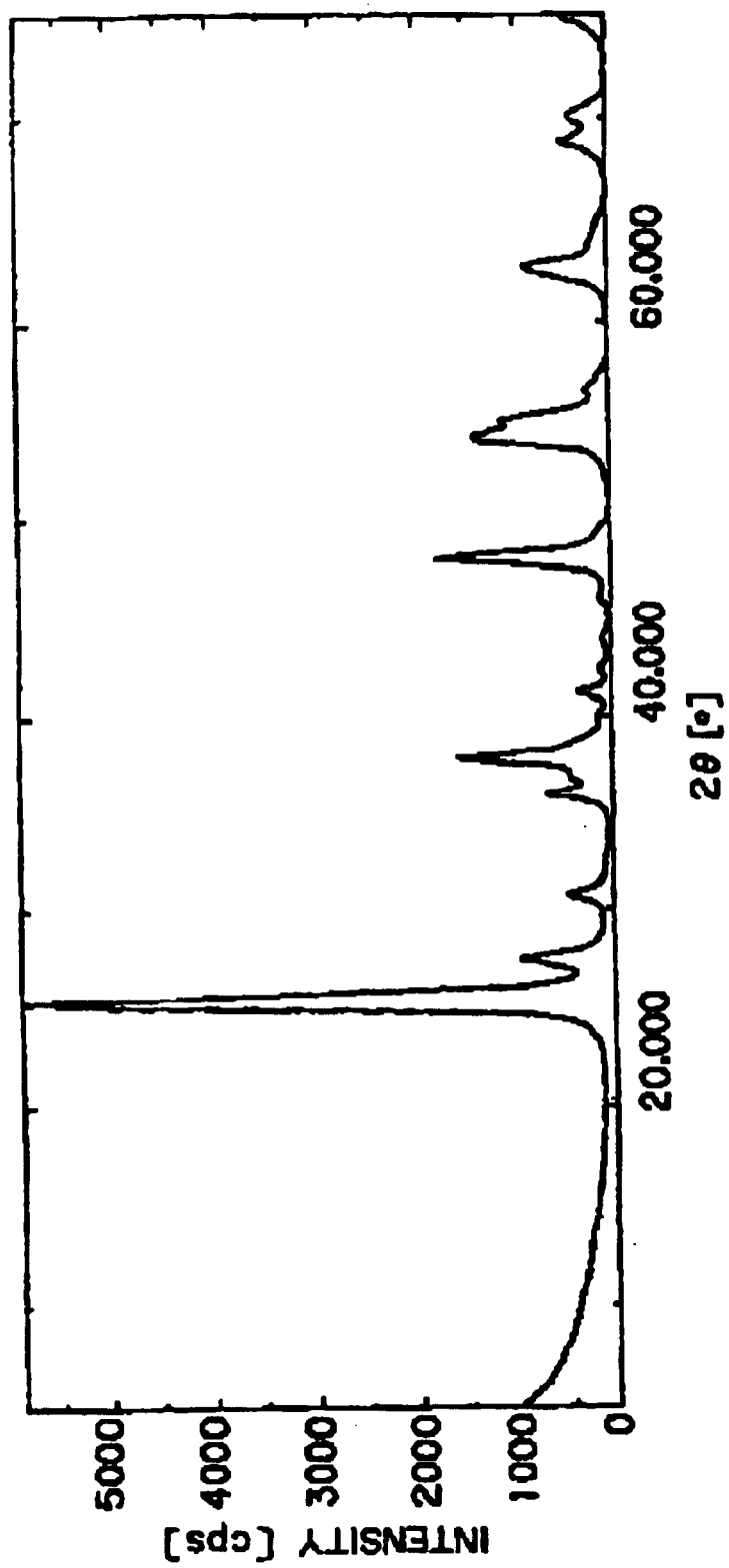
FIG. 11 is a diagram showing the results of the analysis of a crystal structure by X-ray diffractometry (XRD) of titanium oxide in Example B3 of the present invention.

The transparent yellow titania sol (50 g) prepared in Example B1 was placed in a 100-ml vessel, and was treated at 200° C. under hermetically sealed conditions for 3 hr. At that time, the pressure within the closed vessel rose to 16.4 atmA. As a result, white powder was produced. As shown in FIG. 11, the analysis of this powder by X-ray diffractometry (XRD) revealed that the powder was composed mainly of anatase titanium oxide.

Conditions for X-ray diffraction and conditions for the measurement of gas concentration in the examples described above are as follows.
(1) Conditions for X-ray diffraction
X-ray apparatus: RINT 2500 manufactured by Rigaku Industrial Corporation
  X-ray source: Cu Kα radiation
  Output: tube voltage 40 kV, tube current 200 mA
  Scanning: θ/2θ scan
  Scanning range (diffraction angle 2θ): 5° to 75°
  Scanning speed: 0.05° (2θ/sec)
  Detector: scintillation counter
(2) Conditions for measurement of gas concentration
  Acetaldehyde: GC-FID (hydrogen flame ionization detector) type (Shimadzu GC-14B)
  Column: DB-WAX (diameter 0.25 μm, length 30 m)
  Flow rate of carrier gas: 41 ml/min (He)
  Split ratio: 1/40 (makeup gas: He)
  Column temp.: 100° C.
  Injection temp.: 230° C.
  Detector temp.: 250° C.
  $CO_2$: GC-FID (hydrogen flame ionization detector) type (Shimadzu GC-14A)
  Pretreatment at 400° C. in methanizer (MTN-1)
  Column: Porapack Q
  Flow rate of carrier gas: 50 ml/min (hydrogen)
  Column temp.: 50° C.
  Injection temp.: 100° C.
  Detector temp.: 100° C.

The second invention having the above constitution has the following effects.

(1) The aqueous titania sol, titania gel, or titania sol-gel mixture prepared by the treatment according to the present invention contains only titanium oxide and water, and does not contain any organic solvent, and thus can be coated without generating any organic solvent in the step of drying. Further, coating onto members having low organic solvent resistance is also possbile.

(2) Anatase titanium oxide powder having high photocatalytic activity and aqueous slurry containing the same can be produced at a low heat treatment temperature of 270° C. or below, preferably 240° C. or below.

(3) Anatase titanium oxide can be produced through two steps, the step of preparing a starting material and the step of heat treatment. That is, the production process involves a small number of steps and is simple.

(4) When the production of powdery titanium oxide is contemplated, what is required after the heat treatment is only to evaporate and remove water at a temperature of about 100° C. Also in this case, no organic solvent is generated.

(5) Anatase titanium oxide after the treatment is present as fine particles at the bottom of the solvent. In this case, stirring (ultrasonic dispersion being also possible) in the solvent (water) used in the preparation of the starting material can realize the production at room temperature of aqueous anatase titanium oxide slurry which is very stable and is free from settling of titanium oxide particles.

(6) The resultant aqueous anatase titanium oxide slurry has very high storage stability and dispersibility, can be coated, at a temperature of about 100° C., as a coating material having excellent photocatalytic activity, and can also be coated on the surface of materials having low heat resistance.

(7) Since the titania sol or the like produced by the treatment according to the present invention is aqueous, the addition of a suitable metal salt is also possible.

Example C1

Titanium isopropoxide (14.96 g) was dissolved in 50 ml of isopropanol to prepare a titanium isopropoxide solution. A previously prepared mixture composed of 2.5 ml of 2 N hydrochloric acid, 3 ml of water, and 94.5 ml of isopropanol was added dropwise at a rate of 10 ml per min for 5 min, that is, in an amount of 50 ml, to the titanium isopropoxide solution. The molar ratio of titanium isopropoxide:water::hydrochloric acid in the titania sol solution thus obtained was 1:3:0.05.

The transparent titania sol (110 g) thus obtained was placed in a 250-ml vessel, and ozone (amount of ozone generated 180 mg/Nl, flow rate of oxygen 40 Nml/min) was passed through the vessel at 25° C. for 60 min. 5 g of the liquid after ozone passage was diluted with 35 g (weight ratio=1:7) of isopropanol.

This liquid was coated on the surface of a glass substrate, and the coating was dried at 110° C. for 30 min. The dried coating had a pencil hardness of 6H or more, and, when subjected to a pressure-sensitive adhesive tape test wherein a pressure-sensitive adhesive tape was applied and then separated, did not cause the separation of the coating. Further, the transparency of the glass was also very good.

Figure 12:
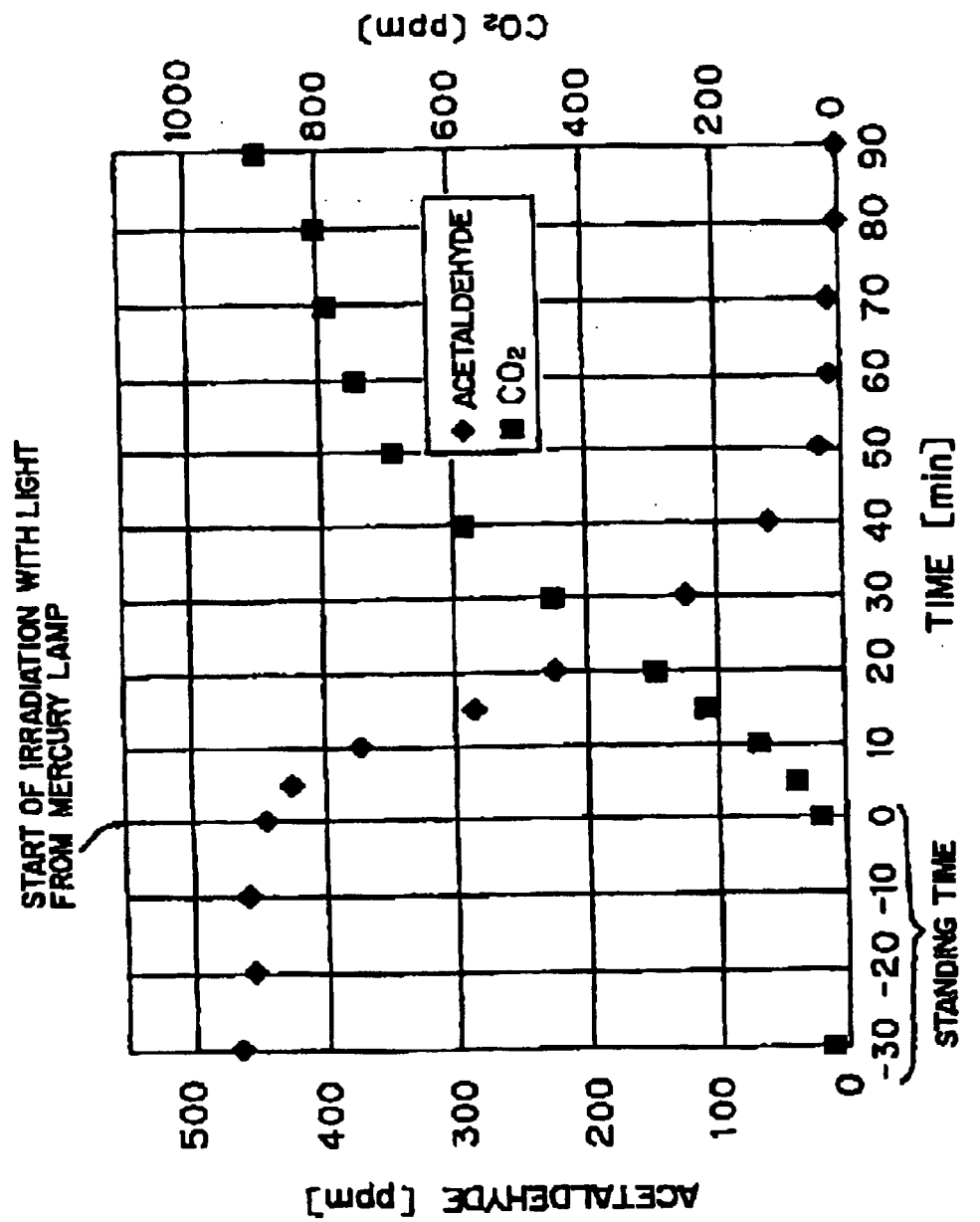
FIG. 12 is a graph showing the results of a test on the decomposition of acetaldehyde by a coating material prepared in Example C1 of the present invention.

The above coating material was brush coated on the inner surface of a one-liter separable flask made of glass, and the coating was dried at 110° C. for 30 min. The amount of titanium oxide coated on the inner surface of the separable flask was 0.02 g. The titanium oxide coating within the separable flask was exposed to light emitted from a low-pressure mercury lamp (10 W) to evaluate the decomposition of 500 ppm of acetaldehyde. The results are shown in FIG. 12.

When light from the mercury lamp was not applied to the titanium oxide coating, upon injection of acetaldehyde into the flask, the adsorption of acetaldehyde onto titanium oxide adhered on the inner surface of the flask caused a reduction in acetaldehyde concentration only by about 10%. Thereafter, however, the acetaldehyde concentration remained unchanged (corresponding to −30 min to 0 min in FIG. 12). On the other hand, the application of light from the mercury lamp reduced the concentration of acetaldehyde in a gas atmosphere within the flask, and the whole quantity of acetaldehyde disappeared about 50 min after the initiation of the light irradiation. Further, analysis was carried out for carbon dioxide (decomposition product of acetaldehyde) within the flask. As a result, it was found that, simultaneously with the application of light from the mercury lamp, the concentration of carbon dioxide within the flask increased.

The above results show that acetaldehyde was decomposed and removed by the photocatalyst.

Example C2

The transparent titania sol (110 g) prepared in the process described in Example C1 was placed in a 250-ml vessel, and ozone (amount of ozone generated 180 mg/Nl, flow rate of oxygen 40 Nml/min) was passed through the vessel at 25° C. for 60 min. 5 g of the liquid after ozone passage was diluted with 35 g (weight ratio=1:7) of isopropanol, and 0.5 g of anatase titanium oxide slurry produced by treating the transparent titania sol at 240° C. for 3 hr under hermetically sealed conditions was added to prepare a titanium oxide coating material.

This coating material was coated on the surface of a glass substrate, and the coating was dried at 110° C. for 30 min. The dried coating had a pencil hardness of 6H or more, and, when subjected to a pressure-sensitive adhesive tape test wherein a pressure-sensitive adhesive tape was applied and then separated, did not cause the separation of the coating. Further, the transparency of the glass was also very good.

Figure 13:
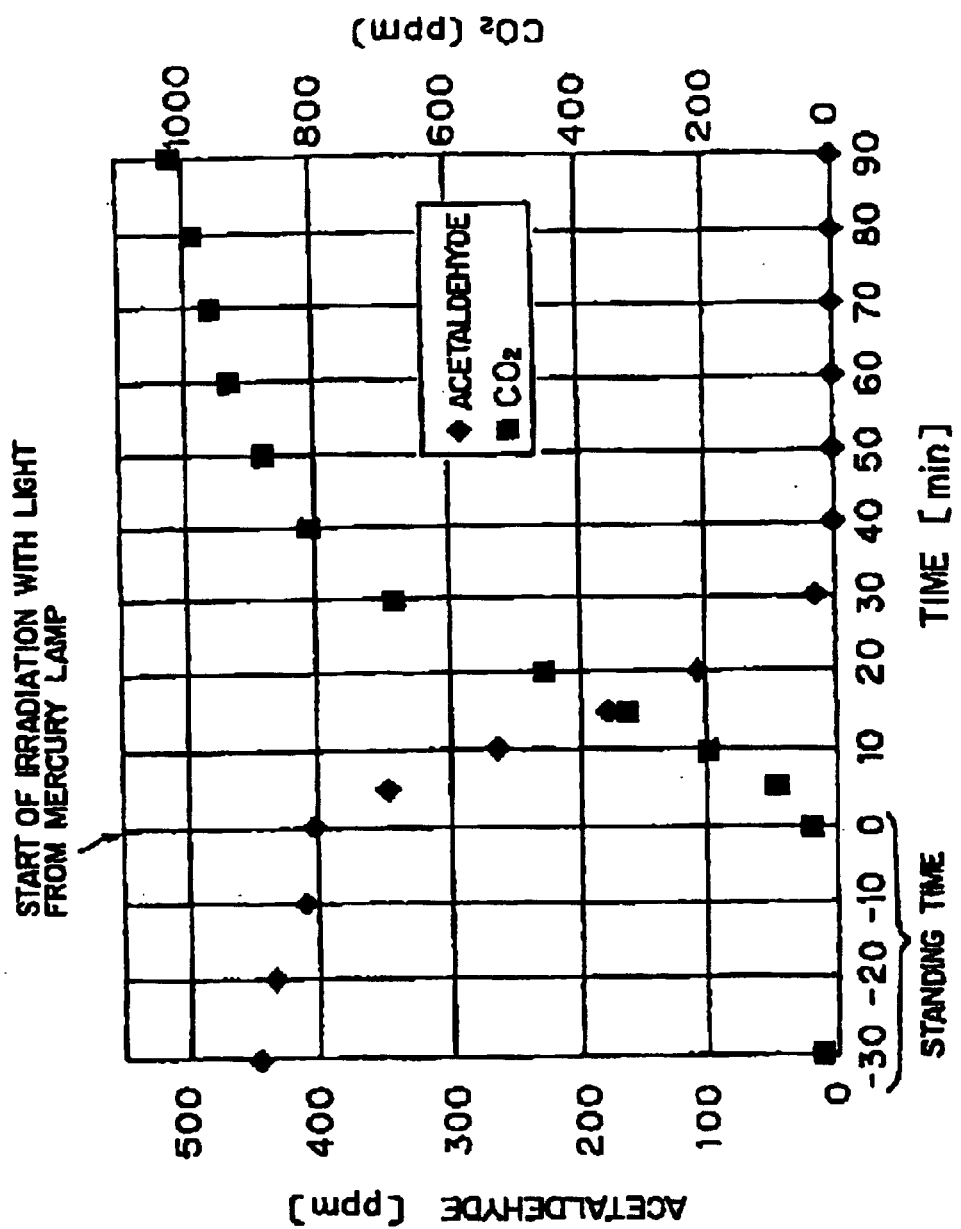
FIG. 13 is a graph showing the results of a test on the decomposition of acetaldehyde by a coating material prepared in Example C2 of the present invention.

The above coating material was brush coated on the inner surface of a one-liter separable flask made of glass, and the coating was dried at 110° C. for 30 min. The amount of titanium oxide coated on the inner surface of the separable flask was 0.04 g. In the same manner as in Example C1, the titanium oxide coating within the separable flask was exposed to light emitted from a low-pressure mercury lamp (10 W) to evaluate the decomposition of 500 ppm of acetaldehyde. The results are shown in FIG. 13.

When light from the mercury lamp was not applied to the titanium oxide coating, upon injection of acetaldehyde into the flask, the adsorption of acetaldehyde onto titanium oxide adhered on the inner surface of the flask caused a reduction in acetaldehyde concentration only by about 20%. Thereafter, however, the acetaldehyde concentration remained unchanged (corresponding to −30 min to 0 min in FIG. 13). On the other hand, the application of light from the mercury lamp reduced the concentration of acetaldehyde in the flask, and the whole quantity of acetaldehyde disappeared about 40 min after the initiation of the light irradiation. Further, analysis was carried out for carbon dioxide within the flask. As a result, it was found that, simultaneously with the application of light from the mercury lamp, the concentration of carbon dioxide within the flask increased.

The above results show that acetaldehyde was decomposed and removed by the photocatalyst having increased activity.

Example C3

The transparent titania sol (110 g) prepared in the process described in Example C1 was placed in a 250-ml vessel, and ozone (amount of ozone generated 180 mg/Nl, flow rate of oxygen 40 Nml/min) was passed through the vessel at 25° C. for 60 min. 5 g of the liquid after ozone passage was diluted with 35 g (weight ratio=1:7) of isopropanol, and 0.5 g of anatase titanium oxide powder (P-25, manufactured by Nippon Aerosil Co., Ltd.) was added to prepare a titanium oxide coating material.

This coating material was coated on the surface of a glass substrate, and the coating was dried at 110° C. for 30 min. The dried coating had a pencil hardness of 6H or more, and, when subjected to a pressure-sensitive adhesive tape test wherein a pressure-sensitive adhesive tape was applied and then separated, did not cause the separation of the coating. Further, the transparency of the glass was also very good.

The above coating material was brush coated on the inner surface of a one-liter separable flask made of glass, and the coating was dried at 110° C. for 30 min. The amount of titanium oxide coated on the inner surface of the separable flask was 0.04 g. In the same manner as in Example C1, the titanium oxide coating within the separable flask was exposed to light emitted from a low-pressure mercury lamp (10 W) to evaluate the decomposition of 500 ppm of acetaldehyde. As a result, acetaldehyde within the flask was entirely decomposed into carbon dioxide by the application of light from the mercury lamp.

The above results show that acetaldehyde was decomposed and removed by the photocatalyst having increased activity.

Comparative Example C1

Figure 14:
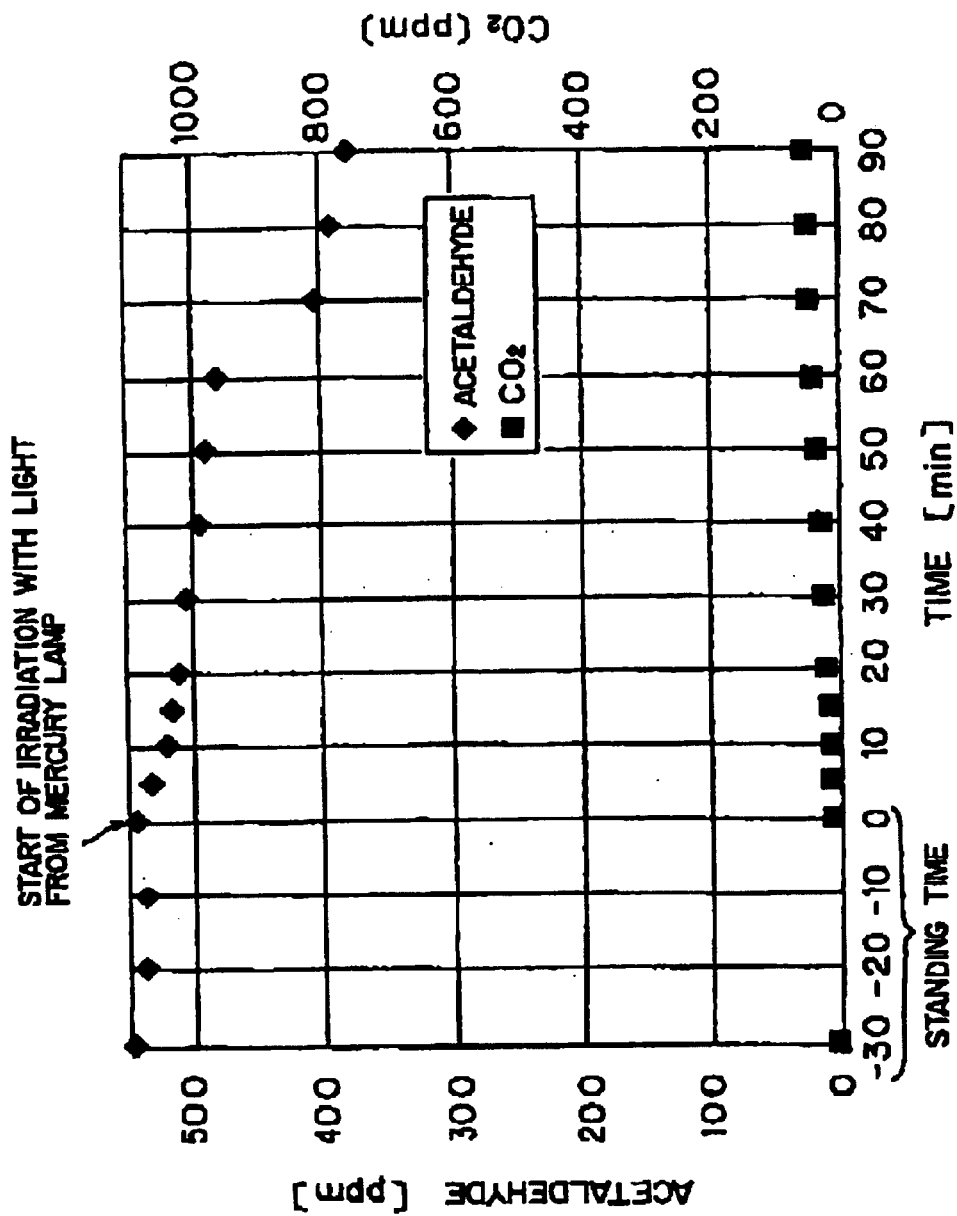
FIG. 14 is a graph showing the results of a test on the decomposition of acetaldehyde in Comparative Example C1.

Light emitted from a low-pressure mercury lamp (10 W) was applied to the inside of a one-liter separable flask made of glass to evaluate the decomposition of 500 ppm of acetaldehyde. The results are shown in FIG. 14.

Upon the application of light from the mercury lamp, only a reduction in acetaldehyde by the adsorption of acetaldehyde onto the inner surface of the flask took place, and carbon dioxide as a decomposition product of acetaldehyde was not evolved.

The third invention having the above constitution has the following effects.

(1) Titanium oxide having excellent photocatalytic activity can be coated onto members with high adhesion strength, and the high adhesion strength can be maintained. In addition, the photocatalytic activity can persist for a long period of time.

(2) The titanium oxide coating material produced by the production process according to the present invention can be coated at a low temperature, and can also be coated on the surface of materials having low heat resistance. For example, when isopropyl alcohol is used as a diluenet or a solvent, titanium oxide coating at a low temperature of 110° C. or below can be realized.

(3) The material after ozone treatment as such can be utilized as a photocatalyst. In addition, when a previously prepared photocatalyst, for example, anatase titanium oxide powder or anatase titanium oxide slurry is separately added, the catalytic activity can be increased.

(4) The titanium oxide coating material produced by the production process according to the present invention is highly transparent, and thus does not deteriorate the appearance of members to be coated.

(5) In a process wherein a titanium oxide coating material is produced and coated, there is no need to provide, for example, the step of recovering precipitates of titanium hydroxide, and only ozone treatment is carried out. Thus, the process is simple.

What is claimed is:

1. A process for producing anatase titanium oxide, comprising the steps of:

heat treating a titania sol solution, a titania gel, or a titania sol-gel mixture in a closed vessel under pressure, said titania sol solution, titania gel, or titania sol-gel mixture containing as a solvent an alcohol having a structure represented by formula $C_nH_{2n+1}OH$; and then drying the treated product to prepare anatase titanium oxide powder.

2. The process for producing anatase titanium oxide according to claim 1, wherein the titania sol solution, the titania gel, or the titania sol-gel mixture is heat treated in the temperature range of 80 to 250° C. in the closed vessel.

3. The process for producing anatase titanium oxide according to claim 1, wherein the titania sol solution, the titania gel, or the titania sol-gel mixture is heat treated in the closed vessel under a pressure of 1.5 to 350 atmA.

4. The process for producing anatase titanium oxide according to claim 1, wherein the contents of the closed vessel are heated to evaporate the solvent contained in the titania sol solution, the titania gel, or the titania sol-gel mixture, whereby the inside of the closed vessel is pressurized by gas generated as a result of the evaporation of the solvent.

5. The process for producing anatase titanium oxide according to claim 1, wherein inert gas is introduced into the closed vessel to pressurize the inside of the closed vessel.

6. The process for producing anatase titanium oxide according to claim 1, wherein at least one member selected from the group consisting of acidic materials, alkaline materials, organic polymers, and inorganic materials is added to the titania sol solution, the titania gel, or the titania sol-gel mixture.

7. A process for producing anatase titanium oxide, comprising the steps of:

heat treating a substantially organic solvent-free aqueous titania sol solution, titania gel, or titania sol-gel mixture in a closed vessel under pressure; and then drying the treated product to prepare anatase titanium oxide powder, wherein a titanium alkoxide is provided as a starting material for the production of a substantially organic solvent-free aqueous titania sol solution, titania gel, or titania sol-gel mixture and is hydrolyzed in aqueous hydrogen peroxide or aqueous ozone and, at the same time, is dissolved in aqueous hydrogen peroxide or aqueous ozone to produce a substantially organic solvent-free aqueous titania sol solution, titania gel, or titania sol-gel mixture.

8. The process for producing anatase titanium oxide according to claim 7, wherein the substantially organic solvent-free aqueous titania sol solution, titania gel, or titania sol-gel mixture is heat treated in the temperature range of 120 to 270° C. in the closed vessel.

9. The process for producing anatase titanium oxide according to claim 7, wherein the contents of the closed vessel are heated to evaporate the solvent contained in the substantially organic solvent-free aqueous titania sol solution, titania gel, or titania sol-gel mixture, whereby the inside of the closed vessel is pressurized at a pressure of 1.5 to 33 atmA by gas generated as a result of the evaporation of the solvent.

10. The process for producing anatase titanium oxide according to claim 7, wherein at least one member selected from the group consisting of water-soluble metal salts, acidic materials, alkaline materials, organic polymers, inorganic materials, and metal alkoxides other than titanium alkoxides is added to the substantially organic solvent-free aqueous titania sol solution, titania gel, or titania sol-gel mixture.

11. The process for producing anatase titanium oxide according to claim 7, wherein inert gas is introduced into the closed vessel to pressurize the inside of the closed vessel.

* * * * *